(12) United States Patent
Miyake

(10) Patent No.: US 11,181,782 B2
(45) Date of Patent: Nov. 23, 2021

(54) LIQUID CRYSTAL PANEL AND SCANNING ANTENNA

(71) Applicant: SHARP KABUSHIKI KAISHA, Sakai (JP)

(72) Inventor: Isamu Miyake, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 376 days.

(21) Appl. No.: 16/319,125

(22) PCT Filed: Jul. 12, 2017

(86) PCT No.: PCT/JP2017/025396
§ 371 (c)(1),
(2) Date: Jan. 18, 2019

(87) PCT Pub. No.: WO2018/016398
PCT Pub. Date: Jan. 25, 2018

(65) Prior Publication Data
US 2021/0103190 A1    Apr. 8, 2021

(30) Foreign Application Priority Data
Jul. 19, 2016  (JP) .................................. 2016-141603

(51) Int. Cl.
*G02F 1/1337*  (2006.01)
*H01Q 13/22*  (2006.01)
(Continued)

(52) U.S. Cl.
CPC ......... *G02F 1/133711* (2013.01); *H01Q 3/44* (2013.01); *H01Q 13/22* (2013.01); *H01Q 21/06* (2013.01)

(58) Field of Classification Search
CPC ................................................ G02F 1/133711
See application file for complete search history.

(56) References Cited

U.S. PATENT DOCUMENTS 8,525,941 B2   9/2013  Shi et al.
9,557,605 B2   1/2017  Miyake et al.
(Continued)

FOREIGN PATENT DOCUMENTS

CN   101930134 A   12/2010
CN   103154809 A   6/2013
(Continued)

*Primary Examiner* — Joseph L Williams
(74) *Attorney, Agent, or Firm* — ScienBiziP, P.C.

(57) ABSTRACT

A liquid crystal panel P according to the present invention includes: a liquid crystal layer LC; and a pair of first and second substrates 100 and 200 disposed with the liquid crystal layer LC interposed therebetween and including an alignment film M formed on a surface of each of the first and second substrates facing the liquid crystal layer, or a surface of any one of the first and second substrates facing the liquid crystal layer. The alignment film M contains a carboxyl group-containing polymer containing a carboxyl group. The liquid crystal compound constituting the liquid crystal layer LC contains at least one selected from the group consisting of a cyano group, a heterocyclic ring, —$OCF_2$—, a carbon-carbon triple bond and a trifluoromethyl group, contains an aliphatic alkyl group at a terminal thereof, and does not contain an isothiocyanate group. Antenna units are arranged.

13 Claims, 8 Drawing Sheets

(51) Int. Cl.
*H01Q 21/06* (2006.01)
*H01Q 3/44* (2006.01)

(56) References Cited

U.S. PATENT DOCUMENTS

| | | | |
|---|---|---|---|
| 9,798,179 B2 | 10/2017 | Miyachi et al. |
| 2007/0273599 A1 | 11/2007 | Haziza |
| 2008/0036664 A1 | 2/2008 | Haziza |
| 2008/0048922 A1 | 2/2008 | Haziza |
| 2008/0111755 A1 | 5/2008 | Haziza |
| 2008/0117113 A1 | 5/2008 | Haziza |
| 2008/0117114 A1 | 5/2008 | Haziza |
| 2008/0316142 A1 | 12/2008 | Haziza |
| 2009/0058747 A1 | 3/2009 | Haziza |
| 2009/0091500 A1 | 4/2009 | Haziza |
| 2012/0013836 A1 | 1/2012 | Teraoka et al. |
| 2012/0092577 A1 | 4/2012 | Shi et al. |
| 2012/0194399 A1 | 8/2012 | Bily et al. |
| 2013/0196565 A1 | 8/2013 | Miyake et al. |
| 2013/0222740 A1 | 8/2013 | Miyachi et al. |
| 2013/0271713 A1 | 10/2013 | Miyake et al. |
| 2014/0266946 A1 | 9/2014 | Bily et al. |
| 2015/0229028 A1 | 8/2015 | Bily et al. |
| 2016/0040066 A1 | 2/2016 | Wittek et al. |
| 2016/0359234 A1 | 12/2016 | Bily et al. |
| 2016/0372834 A1 | 12/2016 | Bily et al. |
| 2017/0130129 A1 | 5/2017 | Wittek et al. |

FOREIGN PATENT DOCUMENTS

| | | |
|---|---|---|
| JP | 2009-538565 A | 11/2009 |
| JP | 2013-539949 A | 10/2013 |
| JP | 5698328 B2 | 4/2015 |
| JP | 2016-037607 A | 3/2016 |
| JP | 2016-512408 A | 4/2016 |
| WO | 2010/106915 A1 | 9/2010 |

LIQUID CRYSTAL PANEL AND SCANNING ANTENNA

TECHNICAL FIELD

The present invention relates to a liquid crystal panel and a scanning antenna.

BACKGROUND ART

In recent years, besides a liquid crystal display device, a device having a liquid crystal panel in which a liquid crystal layer is interposed between a pair of substrates has been known. Examples of the device can include a scanning antenna (for example, see Patent Documents 1 to 3). The scanning antenna is an antenna using high dielectric anisotropy (birefringence) of the liquid crystal (including a nematic liquid crystal and a polymer dispersed liquid crystal), and has a beam scanning function that can change a direction of a beam when transmitting or receiving microwaves or the like. The scanning antenna has a configuration (that is, the liquid crystal panel) in which a liquid crystal layer is interposed between a pair of substrates with an electrode.

In addition, examples of other devices can include a liquid crystal lens (for example, see Patent Document 4). The liquid crystal lens, which is an optical element, uses a liquid crystal and controls a focal length by an applied voltage. The liquid crystal lens also includes a configuration (that is, the liquid crystal panel) in which a liquid crystal layer is interposed between a pair of substrates with an electrode.

It should be noted that alignment films for controlling alignment directions of liquid crystal molecules are typically formed on the outermost surface of the substrate facing the liquid crystal layer also in the scanning antenna, the liquid crystal lens, or the like, similarly to the liquid crystal display device according to the related art.

RELATED ART DOCUMENT

Patent Document

Patent Document 1: Japanese Translation of PCT International Application Publication NO. JP-T-2013-539949
Patent Document 2: Japanese Translation of PCT International Application Publication NO. JP-T-2016-512408
Patent Document 3: Japanese Translation of PCT International Application Publication NO. JP-T-2009-538565
Patent Document 4: Japanese Patent Publication NO. 5698328

Problem to be Solved by the Invention

Liquid crystal compounds having higher polarity (high dielectric anisotropy) are used in the scanning antenna, or the like, in comparison to that in the existing liquid crystal display device. For example, liquid crystal molecules (liquid crystal compounds) containing an isothiocyanate group are used at terminals thereof. When the liquid crystal molecules are used, for example, when the liquid crystal panel is aged at a high temperature (for example, from 85 to 95° C.) for re-alignment treatment, depending on a kind of alignment films, the alignment film reacts with the liquid crystal molecules, and the liquid crystal molecules are integrally attached to the alignment films in some cases. In the liquid crystal molecules attached to the alignment films, it is estimated that the isothiocyanate group side reacts with the alignment film, and an aliphatic alkyl group at the other terminal thereof faces a liquid crystal layer side. Therefore, in the alignment film, the aliphatic alkyl group or the like of the attached liquid crystal molecules acts on the aliphatic alkyl group at the terminals of the liquid crystal compounds in the liquid crystal layer, thereby unnecessarily vertically aligning the liquid crystal compound.

In addition, when the liquid crystal panel is aged at a high temperature (for example, from 85 to 95° C.), the liquid crystal molecules containing the isothiocyanate group react with each other to be dimerized and precipitated as crystals in the liquid crystal layer.

When the alignment defects, the crystals, or the like of the liquid crystal molecules occur in the liquid crystal layer, a malfunction of the liquid crystal panel is caused, which becomes a problem.

DISCLOSURE OF THE PRESENT INVENTION

An object of the present invention is to provide a liquid crystal panel having excellent heat resistance and a scanning antenna.

Means for Solving the Problem

The present inventors found out that when a liquid crystal panel including a liquid crystal layer containing liquid crystal compounds containing an isothiocyanate group and an alignment film containing a polymer containing a carboxyl group is exposed to a high temperature (for example, from 85 to 95° C.), a part of the liquid crystal compounds reacts with the alignment film to be attached to the alignment film, and due to the influence of the attached liquid crystal compounds, alignment defects of the liquid crystal compounds (liquid crystal molecules) occur in the liquid crystal layer, and the liquid crystal compounds are dimerized and precipitated as crystals in the liquid crystal layer. The present invention is based on the findings described above.

A liquid crystal panel according to the present invention includes: a liquid crystal layer; and a pair of first and second substrates disposed with the liquid crystal layer interposed therebetween and including an alignment film formed on a surface of each of the first and second substrates facing the liquid crystal layer, or a surface of any one of the first and second substrates facing the liquid crystal layer. The alignment film contains a carboxyl group-containing polymer containing a carboxyl group, the liquid crystal compound constituting the liquid crystal layer contains at least one selected from the group consisting of a cyano group, a heterocyclic ring, $-OCF_2-$, a carbon-carbon triple bond and a trifluoromethyl group, contains an aliphatic alkyl group at a terminal thereof, and does not contain an isothiocyanate group. Antenna units are arranged.

In the liquid crystal panel, the liquid crystal compound may preferably contain at least two selected from the group. In order to obtain a high dielectric anisotropy (As), it is preferable that at least two selected from the group be contained in one liquid crystal compound.

In the liquid crystal panel, the alignment film may contain a carboxyl group-free polymer containing no carboxyl group.

In the liquid crystal panel, the carboxyl group-containing polymer may preferably be a polyamic acid or a carboxyl group-containing acrylic polymer containing a carboxyl group.

In the liquid crystal panel, it is preferable that the carboxyl group-free polymer be polyimide or a carboxyl group-free acrylic polymer containing no carboxyl group.

Further, a liquid crystal panel according to the present invention includes: a liquid crystal layer; and a pair of first and second substrates disposed with the liquid crystal layer interposed therebetween and including an alignment film formed on a surface of each of the first and second substrates facing the liquid crystal layer, or a surface of any one of the first and second substrates facing the liquid crystal layer. The alignment film is formed of a mixed resin formed by mixing a polyimide and other polymer. Antenna units are arranged. The liquid crystal compound constituting the liquid crystal layer may contain an aliphatic alkyl group at a terminal thereof and contain an isothiocyanate group.

In the liquid crystal panel, the liquid crystal compound may preferably further contain at least one selected from the group consisting of a cyano group, a heterocyclic ring, —$OCF_2$—, a carbon-carbon triple bond, and a trifluoromethyl group. In order to obtain a high dielectric anisotropy (Δε), it is preferable that at least two selected from the group be contained in the liquid crystal compound. Further, it is particularly preferable that at least two selected from the group be contained in one liquid crystal compound.

In the liquid crystal panel, it is preferable that the carboxyl group-free polymer be a polyimide or a carboxyl group-free acrylic polymer containing no carboxyl group.

Further, a liquid crystal panel according to the present invention includes: a liquid crystal layer; and a pair of first and second substrates disposed with the liquid crystal layer interposed therebetween and including an alignment film formed on a surface of each of the first and second substrates facing the liquid crystal layer, or a surface of any one of the first and second substrates facing the liquid crystal layer. The alignment film is formed of a mixed resin formed by mixing polyimide and other polymer. Antenna units are arranged.

In the liquid crystal panel, the other polymer may be a polyamic acid.

In the liquid crystal panel, the liquid crystal compound constituting the liquid crystal layer may preferably contain an aliphatic alkyl group at a terminal thereof and contain an isothiocyanate group.

In the liquid crystal panel, the liquid crystal compound constituting the liquid crystal layer may contain at least one selected from the group consisting of a cyano group, a heterocyclic ring, —$OCF_2$—, a carbon-carbon triple bond, and a trifluoromethyl group and contain the aliphatic alkyl group at the terminal thereof, and may not contain the isothiocyanate group. In this case, in order to obtain a high dielectric anisotropy (Δε), the liquid crystal compound may preferably contain at least two selected from the group. In particular, at least two selected from the group may preferably be contained in one liquid crystal compound.

In the liquid crystal panel, it is preferable that the dielectric anisotropy (Δε) of the liquid crystal layer is 10 or more.

In the liquid crystal panel, from the viewpoint of the high dielectric anisotropy (Δε) and good reliability, it is preferable that the liquid crystal compound may contain two or more —$OCF_2$— contained in one molecule thereof.

In the liquid crystal panel, from the viewpoint of the high dielectric anisotropy (Δε) and the good reliability, it is preferable that the liquid crystal compound may contain the cyano group and the carbon-carbon triple bond contained in one molecule thereof.

In the liquid crystal panel, from the viewpoint of the high dielectric anisotropy (Δε) and the good reliability, it is preferable that the liquid crystal compound may contain the cyano group and the heterocyclic ring contained in one molecule thereof.

In the liquid crystal panel, from the viewpoint of the high dielectric anisotropy (Δε) and the good reliability, it is preferable that the liquid crystal compound may contain the heterocyclic ring and the carbon-carbon triple bond contained in one molecule thereof.

In the liquid crystal panel, from the viewpoint of the high dielectric anisotropy (Δε) and the good reliability, it is preferable that the liquid crystal compound may contain the trifluoromethyl group and the carbon-carbon triple bond contained in one molecule thereof.

In the liquid crystal panel, from the viewpoint of the high dielectric anisotropy (Δε) and the good reliability, it is preferable that the liquid crystal compound may contain carbon-carbon triple bond and the —$OCF_2$— contained in one molecule thereof.

In the liquid crystal panel, from the viewpoint of the high dielectric anisotropy (Δε) and the good reliability, it is preferable that the liquid crystal compound may contain the trifluoromethyl group and the —$OCF_2$— contained in one molecule thereof.

Further, a scanning antenna according to the present invention includes the liquid crystal panel according to any one of the above descriptions; and a reflective conductive plate that is disposed to face an opposite surface of a second dielectric substrate on which a slot electrode is not formed with a dielectric layer interposed therebetween. The first substrate of the liquid crystal panel includes a thin film transistor (TFT) substrate that includes a first dielectric substrate, TFTs supported by the first dielectric substrate, patch electrodes electrically connected to the TFTs, and a first alignment film disposed to cover the TFTs and the patch electrodes and constituting the alignment film. The second substrate of the liquid crystal panel includes a slot substrate that includes the second dielectric substrate, the slot electrode supported by the second dielectric substrate and including slots, and a second alignment film disposed to cover the slot electrode and constituting the alignment film. The liquid crystal layer of the liquid crystal panel is interposed between the TFT substrate and the slot substrate of which the first alignment film and the second alignment film face each other.

Advantageous Effect of the Invention

According to the present invention, it is possible to provide the liquid crystal panel having excellent heat resistance and the scanning antenna.

MODE FOR CARRYING OUT THE INVENTION

[Liquid Crystal Panel]

Figure 1:
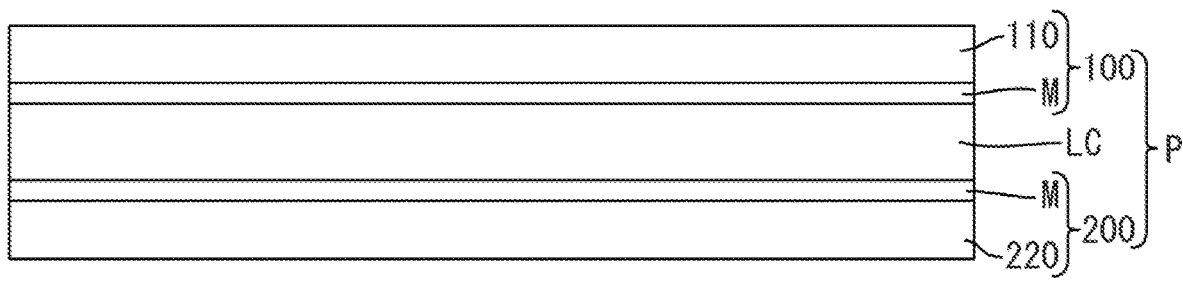
FIG. 1 is a cross-sectional view schematically showing a configuration of a liquid crystal panel included in a liquid crystal device.

FIG. 1 is a cross-sectional view schematically showing a configuration of a liquid crystal panel P included in a liquid crystal device. The liquid crystal panel P includes a liquid crystal layer LC and a pair of first and second substrates 100 and 200 disposed with the liquid crystal layer LC interposed therebetween and including an alignment film M formed on a surface of each of the first and second substrates 100 and 200 facing the liquid crystal layer LC, or a surface of any one of the first and second substrates 100 and 200 facing the liquid crystal layer LC, by using a liquid crystal alignment agent. In FIG. 1, alignment films M and M are each formed on a surface of the first substrate 100 and a surface of the second substrate 200.

The first substrate 100 includes a first support substrate 110 supporting a first electrode (not shown), and the alignment film M is disposed so as to cover the first electrode and the like. Further, the second substrate 200 includes a second support substrate 220 supporting a second electrode (not shown), and the alignment film M is disposed so as to cover the second electrode and the like. In other cases, the first and second electrodes may also be formed on any one of the first substrate 100 or the second substrate 200.

The liquid crystal layer LC used in the liquid crystal panel P may be formed of, for example, a liquid crystal compound (a liquid crystal compound having high dielectric anisotropy) having high polarity. The alignment film M is a polymer film having a function of aligning liquid crystal compounds (liquid crystal molecules) constituting the liquid crystal layer in a predetermined direction. In the liquid crystal panel P, the alignment film M is always in contact with the liquid crystal layer LC.

Here, the liquid crystal layer (liquid crystal compound) LC and the alignment film M used in the liquid crystal panel P are used in combinations shown in a first aspect, a second aspect, and a third aspect to be described to prevent alignment defects, crystals or the like of liquid crystal molecules from occurring in the liquid crystal layer even under a high temperature condition (for example, from 85 to 95° C.). Hereinafter, the first aspect, the second aspect, and the third aspect related to the combinations of a liquid crystal layer (liquid crystal compound) and the alignment film will be described in order.

[First Aspect]

(Alignment Film)

An alignment film according to a first aspect may contain (a) a carboxyl group-containing polymer containing a carboxyl group (hereinafter, referred to as "carboxyl group-containing polymer"), or (b) a carboxyl group-free polymer containing no carboxyl group (hereinafter, referred to as "carboxyl group-free polymer").

<(a) Carboxyl Group-Containing Polymer>

The carboxyl group-containing polymer is a polymer that can be used as an alignment film, and is not particularly limited as long as it is a polymer which can be dissolved in a predetermined organic solvent to be described later and contains a carboxyl group as a functional group. Examples of the carboxyl group-containing polymer can include a polyamic acid.

The polyamic acid is a polymer in which a tetracarboxylic acid dianhydride and a diamine compound are amide-bonded. Examples of the polyamic acid can include, are not particularly limited to, a compound represented by the following Chemical Formula (1).

[Chemical Formula 1]

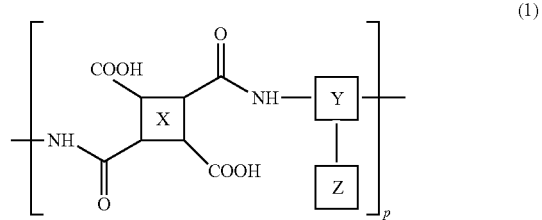

In the Chemical Formula (1), p is any natural number. In addition, in the Chemical Formula (1), when X has a photo-functional group, X has a structure represented by the following Chemical Formulas (2-1) to (2-4), and when Y has a photo-functional group, Y has a structure represented by the following Chemical Formulas (3-1) to (3-8), and when Z has a photo-functional group, Z is represented by the following Chemical Formulas (4-1) to (4-5). In the case of a main chain type polyamic acid, Z is absent.

[Chemical Formula 2]

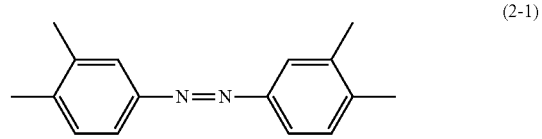

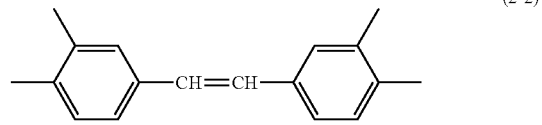

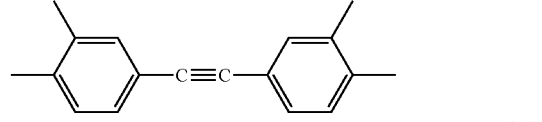

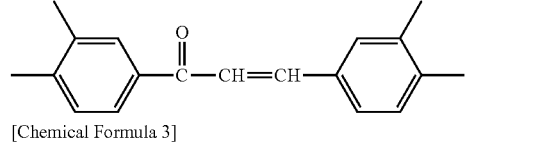

[Chemical Formula 3]

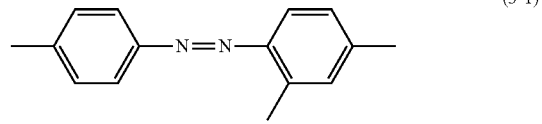

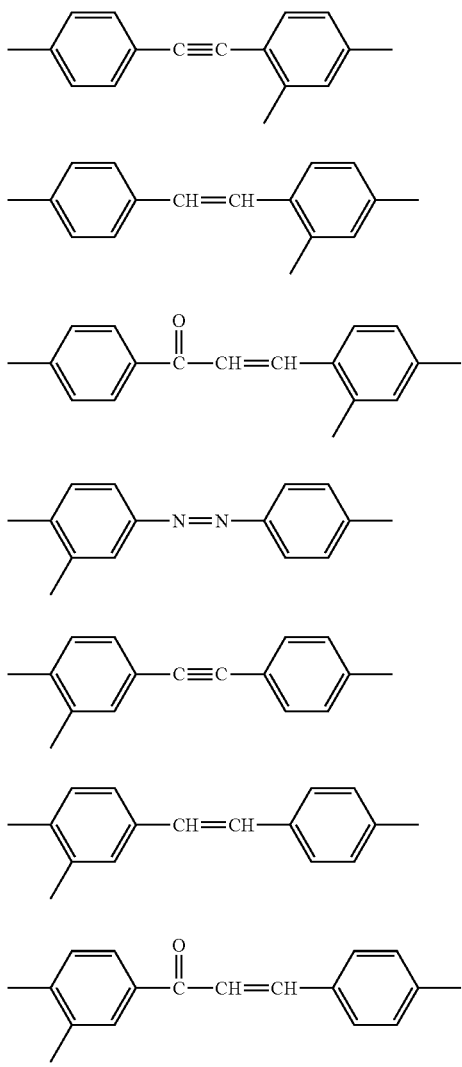

[Chemical Formula 4]

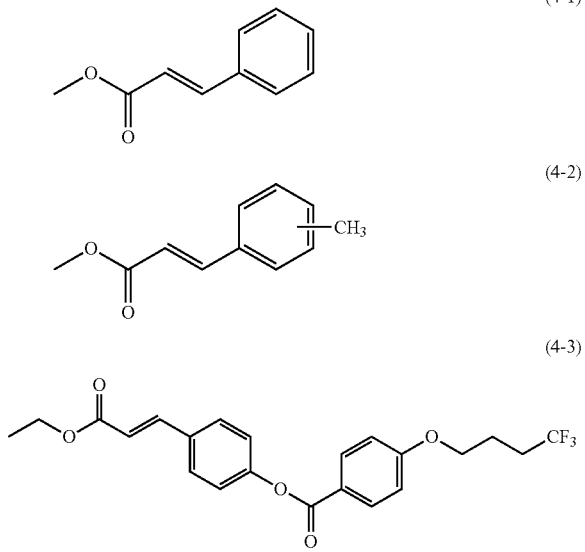

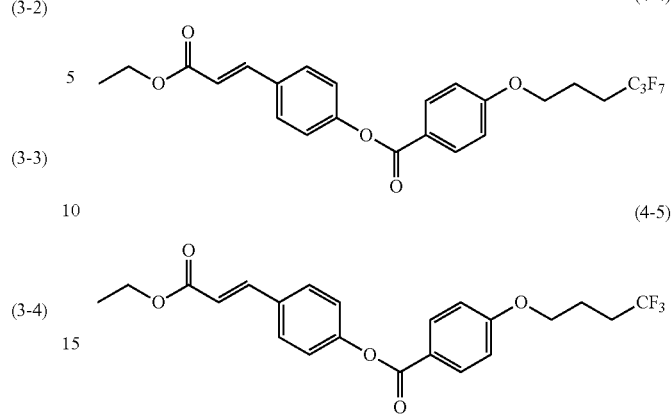

In the above Chemical Formula (1), when X has the photo-functional group, X has a structure including any one of an azobenzene group, a tolan group, a stilbene group, and a chalcone group as described above. Further, in the above Chemical Formula (1), when Y has the photo-functional group, Y has a structure including any one of an azobenzene group, a tolan group, a stilbene group, and a chalcone group as described above. Further, in the above Chemical Formula (1), when Z (side chain) has the photo-functional group, Z has a structure including a cinnamate group as described above.

A specific structure of the polymer represented by the above Chemical Formula (1) above is appropriately selected depending on a direction (for example, a horizontal direction or a vertical direction) in which the liquid crystal compound is aligned.

In the above Chemical Formula (1), when X has a structure other than the photo-functional group, the structure of X is not particularly limited, and can be, for example, structures represented by the following Chemical Formulae (5-1) to (5-7).

[Chemical Formula 5]

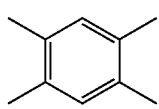

(5-1)

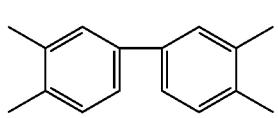

(5-2)

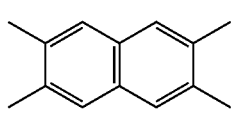

(5-3)

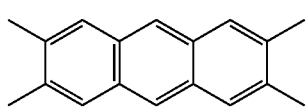

(5-4)

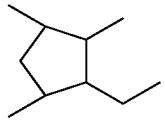

(5-5)

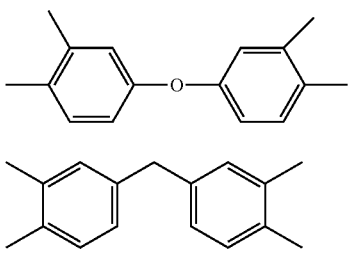

Further, in the above Chemical Formula (1), when Y has a structure other than the photo-functional group, the structure of Y is not particularly limited, and can be, for example, structures represented by the following Chemical Formulae (6-1) to (6-9).

[Chemical Formula 6]

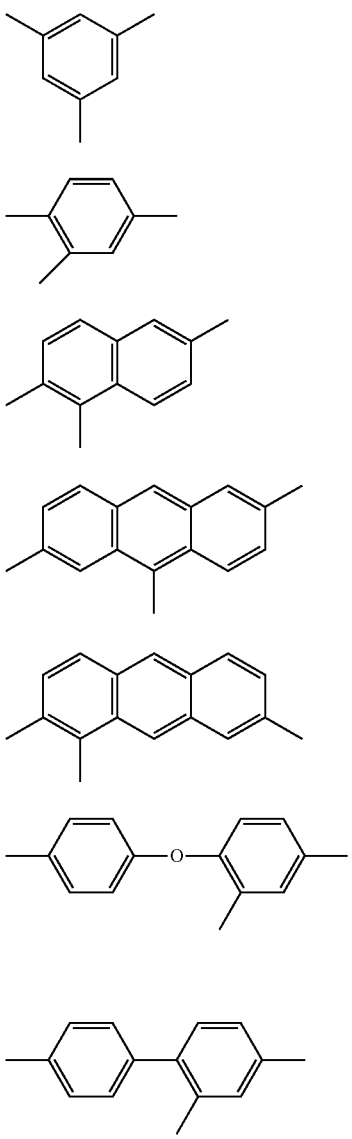

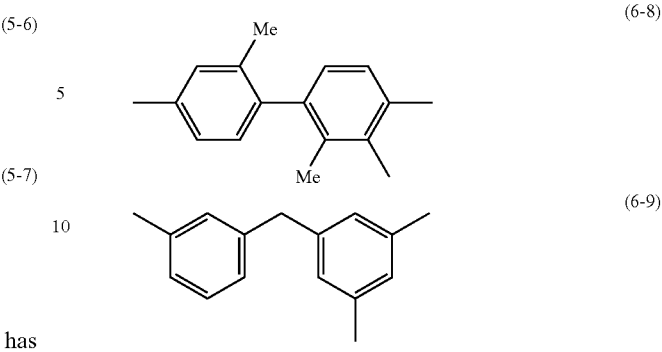

Further, in the above Chemical Formula (1), when Z has a structure other than the photo-functional group, the structure of Z is not particularly limited unless the object of the present invention is impaired.

The polyamic acid may not have the photo-functional group. The polymerization method of the polyamic acid is not particularly limited, but the known methods can be used.

In addition, examples of other carboxyl group-containing polymers can include a carboxyl group-containing acrylic polymer containing a carboxyl group (hereinafter, referred to as "carboxyl group-containing acrylic polymer").

The carboxyl group-containing acrylic polymer is an acrylic polymer containing a carboxyl group as a functional group.

Examples of the carboxyl group-containing acrylic polymer can include a copolymer of an acrylic monomer and a carboxyl group-containing monomer.

Examples of the acrylic monomer can include a polymer of a monomer composition containing alkyl (meth)acrylate containing an alkyl group (hereinafter, simply referred to as "alkyl (meth)acrylate"), (meth)acrylate containing a photo-reactive functional group (photo-functional group) (hereinafter, simply referred to as "photoreactive (meth)acrylate"), and the like. In the present description of the present application, the term "(meth)acryl" means "acryl" and/or "methacryl" (any one or both of "acryl" and "methacryl"). Further, in the present description, the term "photo-functional group" is a functional group exhibiting a characteristic of controlling alignment of the liquid crystal compound by light irradiation.

As the alkyl (meth)acrylate, for example, a compound represented by the following Chemical Formula (7) can be used.

[Chemical Formula 7]

$$CH_2=C(R^1)COOR^2 \qquad (7)$$

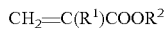

$R^1$ in the above Chemical Formula (7) above is a hydrogen atom or a methyl group. In addition, $R^2$ is a linear or branched-chain alkyl group having 1 to 18 carbon atoms. It should be noted that $R^2$ is preferably a linear or branched-chain alkyl group having 1 to 10 carbon atoms, and more preferably, a linear or branched-chain alkyl group having 1 to 8 carbon atoms.

Specific examples of the alkyl (meth)acrylate can include methyl (meth)acrylate, ethyl (meth)acrylate, propyl (meth)acrylate, isopropyl (meth)acrylate, n-butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, heptyl (meth)acrylate, octyl (meth)acrylate, 2-ethylhexyl (meth)acrylate, isooctyl (meth)

acrylate, nonyl (meth)acrylate, isononyl (meth)acrylate, decyl (meth)acrylate, isodecyl (meth)acrylate, undecyl (meth)acrylate, dodecyl (meth)acrylate (lauryl (meth)acrylate), tridecyl (meth)acrylate, tetradecyl (meth)acrylate, pentadecyl (meth)acrylate, hexadecyl (meth)acrylate, heptadecyl (meth)acrylate, octadecyl (meth)acrylate (stearyl (meth)acrylate), isostearyl (meth)acrylate, and the like. These may be used alone or in combination of two or more thereof.

Further, for example, a compound represented by the following Chemical Formula (8) can be used as the photoreactive (meth)acrylate.

[Chemical Formula 8]

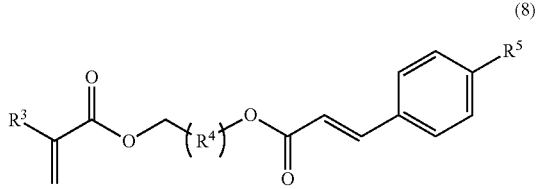

(8)

$R^3$ in the Chemical Formula (8) is a hydrogen atom or a methyl group. Further, $R^4$ is a spacer portion, and is a single bond or a divalent organic group. It should be noted that $R^4$ is not indispensable, and may be omitted. $R^5$ is a modifying group, and is a monovalent organic group or a hydrogen atom. The photoreactive (meth)acrylate reacts to a predetermined light such as ultraviolet rays when it receives the predetermined light, such that a structure of the photoreactive (meth)acrylate is changed.

When the carboxyl group-containing acrylic polymer includes a constitutional unit derived from the photoreactive (meth)acrylate represented by the above Chemical Formula (8) or the like, the alignment film formed of the acrylic polymer can be used as a photo alignment film. When a predetermined light (for example, linearly polarized ultraviolet rays) is irradiated (photo alignment processing) from a specific direction, the photo alignment film exerts a function of aligning the liquid crystal compound in the liquid crystal layer in the specific direction.

The carboxyl group-containing monomer is a monomer having an unsaturated double bond copolymerizable with the acrylic monomer and having a carboxyl group as a functional group. Examples of the carboxyl group-containing monomer can include unsaturated carboxylic acids such as (meth)acrylic acid, fumaric acid, maleic acid, itaconic acid, crotonic acid, and cinnamic acid, unsaturated carboxylic acid anhydrides such as fumaric anhydride, maleic anhydride, and itaconic anhydride, and the like. These carboxyl group-containing monomers may be used alone or in combination of two or more.

In the monomer composition for polymerizing the carboxyl group-containing acrylic polymer, the acrylic monomer is contained, for example, in a proportion of from 60 to 99% by mass of the total monomer components. In addition, the carboxyl group-containing monomer is contained in a proportion of from 1 to 40% by mass of the total monomer components in the monomer composition.

The polymerization method of the carboxyl group-containing acrylic polymer may be the known method, and for example, suspension polymerization, bulk polymerization, emulsion polymerization, and the like can be appropriately selected. It should be noted that upon the polymerization of the carboxyl group-containing acrylic polymer, appropriate components corresponding to the respective polymerization methods such as a polymerization initiator, a chain transfer agent, an emulsifier, and a solvent are appropriately selected from known or conventional components and used. A weight average molecular weight of the carboxyl group-containing acrylic polymer is not particularly limited, unless the object of the present invention is impaired.

In addition to the constitutional unit derived from the acrylic monomer and the constitutional unit derived from the carboxyl group-containing monomer, the carboxyl group-containing acrylic polymer includes a constitutional unit derived from other monomers as long as the object of the present invention is not impaired.

As long as the object of the present invention is not impaired, the carboxyl group-containing acrylic polymer other than the polyamic acid and the carboxyl group-containing acrylic polymer may be used.

<(b) Carboxyl Group-Free Polymer>

The carboxyl group-free polymer is a polymer that can be used as an alignment film, and is not particularly limited as long as it is a polymer which can be dissolved in a predetermined organic solvent used for preparing an alignment agent to be described later and does not contain a carboxyl group as a functional group. Examples of the carboxyl group-free polymer can include a polyimide and the like.

The polyimide is a polymer in which a tetracarboxylic acid dianhydride and a diamine compound are amide-bonded. Examples of the polyimide can include, are not particularly limited to, a compound obtained by imidizing the polyamic acid represented by the above Chemical Formula (1). The imidization of the polyamic acid is carried out, for example, by heating the polyamic acid at a high temperature (for example, from 200 to 250° C.). In addition, for example, a chemical imidization method using acetic anhydride or the like as a dehydrating agent and using pyridine or the like as a catalyst may be used. Ideally, the imidization rate of the polyimide is preferably 100%, but in the present description, it is assumed that substantially no carboxyl group is contained as long as the imidization rate is 90% or more.

As the polyimide, a soluble polyimide which can be easily dissolved in a solvent to be described later is preferable. In addition, the polyimide may contain or may not contain the photo-functional group which can be used as the photo alignment film.

In addition, examples of other carboxyl group-free polymer can include a carboxyl group-free acrylic polymer containing no carboxyl group (hereinafter, referred to as "carboxyl group-free acrylic polymer").

The carboxyl group-free acrylic polymer is, for example, a polymer of an acrylic monomer. Examples of the acrylic monomer include alkyl (meth)acrylate, photoreactive (meth)acrylate and the like as described above.

When the carboxyl group-free acrylic polymer includes a constitutional unit derived from the photoreactive (meth)acrylate, the alignment film formed of the carboxyl group-free acrylic polymer can be used as a photo alignment film. When a predetermined light (for example, linearly polarized ultraviolet rays) is irradiated (photo alignment processing) from a specific direction, the photo alignment film exerts a function of aligning the liquid crystal compound in the liquid crystal layer in the specific direction.

When the (meth)acrylic polymer is used as the alignment film, the (meth)acrylic polymer containing a photo-functional group is preferred from the viewpoint of ease of alignment treatment. This is because a film is generally soft, and therefore the (meth)acrylic polymer tends to cause defects such as scraping of the film when rubbing treatment is performed.

In the monomer composition for polymerizing the carboxyl group-free acrylic polymer, the acrylic monomer is contained, for example, in a proportion of from 60 to 100% by mass of the total monomer components.

Similar to the carboxyl group-containing acrylic polymer, the polymerization method of the carboxyl group-free acrylic polymer may be the known method, and for example, suspension polymerization, bulk polymerization, emulsion polymerization, and the like can be appropriately selected. In addition, upon the polymerization of the carboxyl group-free acrylic polymer, appropriate components corresponding to the respective polymerization methods such as a polymerization initiator, a chain transfer agent, an emulsifier, and a solvent are appropriately selected from known or conventional components and used. A weight average molecular weight of the carboxyl group-free acrylic polymer is not particularly limited, unless the object of the present invention is impaired.

In addition to the constitutional unit derived from the acrylic monomer described above, the carboxyl group-free acrylic polymer includes a constitutional unit derived from other monomers as long as the object of the present invention is not impaired.

As long as the object of the present invention is not impaired, in addition to the polyimide and the carboxyl group-free acrylic polymer, the carboxyl group-free polymer may be used.

The polymer (carboxyl group-containing polymer or carboxyl group-free polymer) used for the alignment film is dissolved in a predetermined organic solvent to prepare a fluid or sol composition (alignment agent) having fluidity. The organic solvent is not particularly limited as long as it can dissolve the polymer used for the alignment film and can be sufficiently removed by heating treatment or the like after film formation. Examples of the organic solvents can include γ-butyrolactone (GBL), diethylene glycol diethyl ether (DEDE), diethylene glycol ethyl methyl ether (DEDM), diisobutyl ketone (DIBK), butyl cellosolve (BC), 1-butoxy-2-propanol (BP), cyclopentanone (CP), N-methyl-2-pyrrolidone (NMP), 1-ethyl-2-pyrrolidone (NEP) and the like. These may be used alone or in combination of two or more thereof.

A method of forming the alignment film by using the alignment agent is not particularly limited, and a known method of forming an alignment film can be applied. For example, the alignment agent is coated on a surface of the first substrate 100 or the like which is a coating object by using a known coating method (for example, a spin coating method, an inkjet method, or the like). The coated film after being coated is appropriately heated for the purpose of removing a solvent, curing a polymer, or the like.

When the coated film formed of the alignment agent is subjected to alignment processing, a function of aligning the liquid crystal compound in a predetermined direction is exerted, and the coated film becomes the alignment film. The alignment processing is not particularly limited, and rubbing processing may be performed. When the coated film is formed of a polymer having the photo-functional group, photo alignment processing in which light (for example, linearly polarized ultraviolet rays) is irradiated from a predetermined direction may also be performed.

It should be noted that the thickness of the alignment film is preferably 300 nm or less, which can provide sufficient alignment property.

The alignment film of the first aspect is suitable for the alignment control of the liquid crystal compound having high polarity as described later.

(Liquid Crystal Layer)

The liquid crystal layer according to the first aspect contains the liquid crystal compound which may contain at least one selected from the group consisting of a cyano group, a heterocyclic ring, —OCF$_2$—, a carbon-carbon triple bond, and a trifluoromethyl group and contain an aliphatic alkyl group at a terminal thereof, and may not contain the isothiocyanate group (NCS group). The liquid crystal compounds can manifest a high dielectric anisotropy due to an operation of a scanning antenna or the like to be described later. Furthermore, the liquid crystal compounds do not cause a reaction such as the isothiocyanate group (NCS group). In addition, the liquid crystal layer contains these liquid crystal compounds, and therefore can obtain the high dielectric anisotropy without causing problems such as crystallization, bubble generation, and alignment change. In particular, the liquid crystal layer can adjust reliability, a threshold voltage, an elastic constant, and a nematic temperature range without damaging the dielectric constant by including two or more kinds of liquid crystal compounds (preferably, each 5% by mass or more).

The heterocyclic ring is not particularly limited as long as the object of the present invention is not impaired, but preferably has, for example, a structure represented by the following Chemical formulas (9-1) to (9-6).

[Chemical Formula 9]

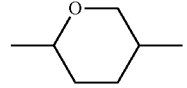

(9-1)

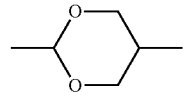

(9-2)

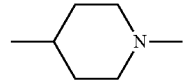

(9-3)

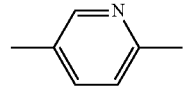

(9-4)

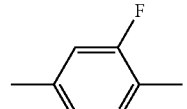

(9-5)

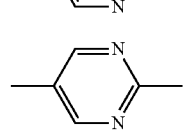

(9-6)

In addition, the liquid crystal compound may more preferably contain at least two selected from the group consisting of a cyano group, a heterocyclic ring, —OCF$_2$—, a carbon-carbon triple bond, and a trifluoromethyl group.

In addition, the aliphatic alkyl group at the terminal of the liquid crystal compound is, for example, a linear-chain alkyl group (for example, ethyl group (C$_2$H$_5$), a propyl group ($C_3H_7$), a butyl group ($C_4H_9$), and a pentyl group ($C_5H_{11}$)) having 2 to 10 carbon atoms, and a part thereof may be substituted with an ester group, an ether group, a ketone group, an amide group, or an alkenyl group. Further, a hydrogen atom may be substituted with a fluorine atom.

In addition, the dielectric anisotropy ($\Delta\varepsilon$) of the liquid crystal layer containing the liquid crystal compounds is preferably 10 or more, and more preferably 15 or more. The liquid crystal layer (liquid crystal compound) is appropriate for, for example, the scanning antenna or the liquid crystal lens to be described later.

Specific examples of the liquid crystal compound used in the first aspect can include compounds represented by the following Chemical Formulas (10-1) to (10-5).

Examples of the liquid crystal compound containing at least a trifluoromethyl group can include a liquid crystal compound represented by the above Chemical Formula (10-5).

Examples of the liquid crystal compound containing two or more —$OCF_2$— in one molecule can include a liquid crystal compound represented by the above Chemical Formula (10-3).

Examples of the liquid crystal compound containing a cyano group and a carbon-carbon triple bond in one molecule can include a liquid crystal compound of the above Chemical Formula (10-2).

[Chemical Formula 10]

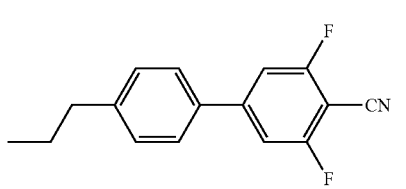

(10-1)

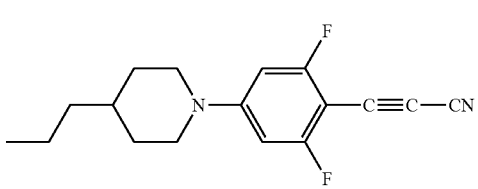

(10-2)

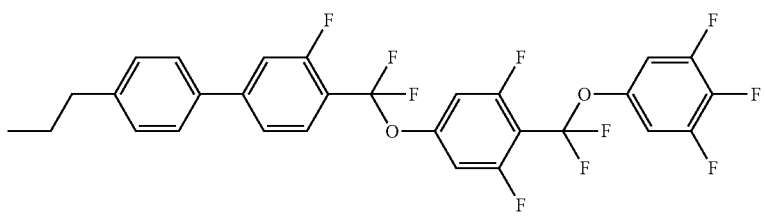

(10-3)

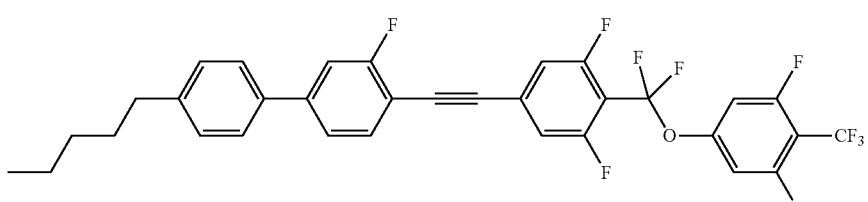

(10-4)

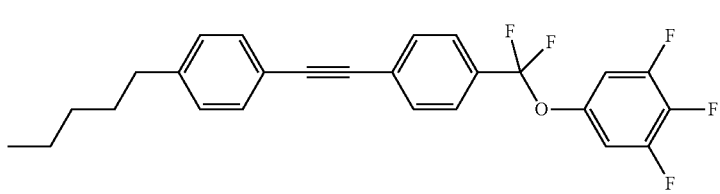

(10-5)

Examples of the liquid crystal compound containing at least a cyano group can include liquid crystal compounds represented by the above Chemical Formulas (10-1) and (10-2).

Examples of the liquid crystal compound containing at least a heterocyclic ring can include liquid crystal compounds represented by the above Chemical Formula (10-2).

Examples of the liquid crystal compound containing at least —$OCF_2$— can include liquid crystal compounds represented by the above Chemical Formulas (10-3), (10-4), and (10-5).

Examples of the liquid crystal compound containing at least a carbon-carbon triple bond can include liquid crystal compounds represented by the above Chemical Formulas (10-2), (10-4), and (10-5).

Examples of the liquid crystal compound containing a cyano group and a heterocyclic ring in one molecule can include a liquid crystal compound represented by the above Chemical Formula (10-2).

Examples of the liquid crystal compound containing a heterocyclic ring and a carbon-carbon triple bond in one molecule can include a liquid crystal compound of the above Chemical Formula (10-2).

Examples of the liquid crystal compound containing a trifluoromethyl group and a carbon-carbon triple bond in one molecule can include a liquid crystal compound represented by the above Chemical Formula (10-4).

Examples of the liquid crystal compound containing a carbon-carbon triple bond and —$OCF_2$— in one molecule can include liquid crystal compounds of the above the above Chemical Formulas (10-4) and (10-5).

Examples of the liquid crystal compound containing a trifluoromethyl group and —OCF$_2$— in one molecule can include a liquid crystal compound represented by the above Chemical Formula (10-4).

In the first aspect, the liquid crystal compounds may be used alone or in combination of two or more thereof.

[Second Aspect]
(Alignment Film)

The alignment film according to a second aspect contains a carboxyl group-free polymer containing no carboxyl group. As the carboxyl group-free polymer according to the second aspect, the carboxyl group-free polymer (for example, polyimide, carboxyl group-free acrylic polymer) according to the first aspect can be used. Therefore, a detailed description of the carboxyl group-free polymer according to the second aspect is omitted.

Similar to the alignment film according to the first aspect, the alignment film according to the second aspect is also prepared as an alignment agent in which the carboxyl group-free polymer is dissolved in a predetermined organic solvent. In addition, a method of forming an alignment film and the like are also the same as in the first aspect, and the detailed description thereof is also omitted.

(Liquid Crystal Layer)

The liquid crystal layer according to the second aspect contains liquid crystal compounds containing an aliphatic alkyl group at the terminal and containing an isothiocyanate group (NCS group). When the liquid crystal layer contains the liquid crystal compounds containing the isothiocyanate group (NCS group), if the carboxyl group is present in the alignment film, protons are isolated from the carboxyl group, the reactivity of the isothiocyanate group (NCS group) is increased. Therefore, in the second aspect, as described above, the alignment film is formed of the compounds containing the carboxyl group-free polymer. That is, in the second aspect, protons are suppressed from being isolated by esterificating, anhydridizing, imidizing and the like the carboxyl group in the alignment film.

In order to suppress the substrate from being warped due to heat, it is more preferable to perform a chemical esterification, anhydridization, imidization in advance, and the like than forming a coated film with the alignment agent and heating the coated film to perform imidization and the like.

In the second aspect, the liquid crystal compound may further contain at least one selected from the group consisting of a cyano group, a heterocyclic ring, —OCF$_2$—, a carbon-carbon triple bond, and a trifluoromethyl group.

In addition, in the second aspect, the dielectric anisotropy ($\Delta\varepsilon$) of the liquid crystal layer containing the liquid crystal compounds is preferably 10 or more. The liquid crystal layer (liquid crystal compound) is appropriate for, for example, the scanning antenna or the liquid crystal lens to be described later.

Specific examples of the liquid crystal compound used in the second aspect can include a compound represented by the following Chemical Formula (11-1).

[Chemical Formula 11]

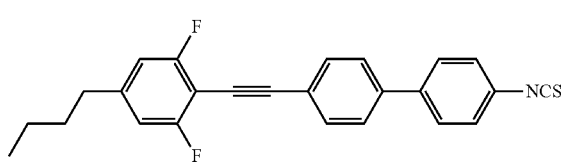

(11-1)

In addition, specific examples of the liquid crystal compound used in the second aspect can include liquid crystal compounds represented by the following Chemical Formulas (12-1) to (12-4).

[Chemical Formula 12]

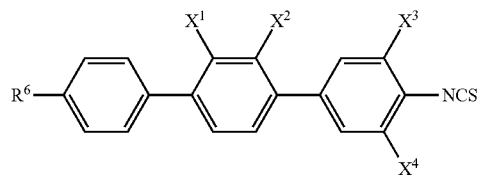

(12-1)

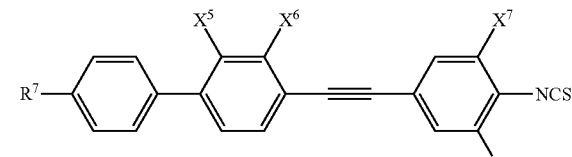

(12-2)

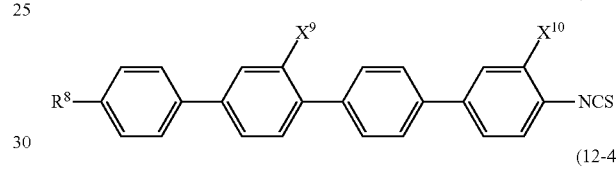

(12-3)

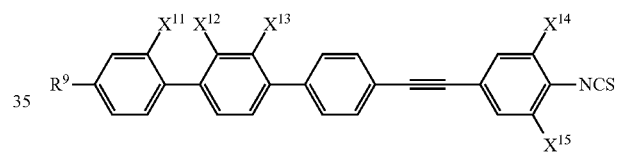

(12-4)

In the above Chemical Formulas (12-1) to (12-4), all of $R^6$, $R^7$, $R^8$, and $R^9$ are a straight-chain alkyl group (for example, an ethyl group ($C_2H_5$), a propyl group ($C_3H_7$), a butyl group ($C_4H_9$), a pentyl group ($C_5H_{11}$)) having 2 to 5 carbon atoms. Further, in the above Chemical Formulas (12-1) to (12-4), $X^1$, $X^2$, $X^3$, $X^4$, $X^5$, $X^6$, $X^7$, $X^8$, $X^9$, $X^{10}$, $X^{11}$, $X^{12}$, $X^{13}$, $X^{14}$, and $X^{15}$ are independent of each other, and are each any one of H (hydrogen atom), F (fluorine atom), $CH_3$ (methyl group), and Cl (chloro group).

In the second aspect, the liquid crystal compounds may be used alone or in combination of two or more thereof.

[Third Aspect]
(Alignment Film)

The alignment film according to a third aspect is formed of a mixed resin obtained by mixing a polyimide and other polymers. As the polyimide according to the third aspect, the polyimide according to the first aspect described above can be used. In addition, examples of the other polymers according to the third aspect may include a polyamic acid. As the polyamic acid, the polyamic acid according to the first aspect described above can be used.

Examples of the method of mixing a polyimide and a polyamic acid can include a method of dissolving a polyimide and a polyamic acid in the organic solvent exemplified in the first aspect. The mixed solution of the polyimide and the polyamic acid is used as the alignment agent for forming an alignment film.

The mixing ratio of the polyimide and the other polymers (for example, polyamic acid) is not particularly limited as long as the object of the present invention is not impaired. The proportion of the polyimide occupied in the alignment film is preferably 10% by mass or more. In the mixed resin, it is preferable that a phase separation occur due to the difference in surface energy or a molecular weight between the polyimide and the other polymers, and the polyimide occupies a large proportion (for example, 50% or more) on the surface of the alignment film after the film formation.

In addition, it was found that when the polyamic acid is used as the other polymers, a small amount of polyamic acid is present on the surface of the alignment film, such that moisture and impurities can be efficiently trapped (captured) and the reaction of the liquid crystal compound can be inhibited. In addition, since the polyimide has low solubility in the solvent, the solubility is improved by blending with the polyamic acid and the polyimide occupies a large proportion of the alignment film surface in contact with the liquid crystal by the phase separation, such that the present invention can be effectively realized.

The method of forming an alignment film and the like according to the third aspect are the same as in the first aspect except that the alignment agent formed of the mixed solution of the polyimide and the polyamic acid is used.

(Liquid Crystal Layer)

Similar to the second aspect, the liquid crystal layer according to the third aspect may include liquid crystal compounds containing an aliphatic alkyl group at the terminal thereof and containing an isothiocyanate group (NCS group), and similar to the first aspect, the liquid crystal layer according to the third aspect may include liquid crystal compounds which contain at least one selected from the group consisting of a cyano group, a heterocyclic ring, —OCF$_2$—, a carbon-carbon triple bond, and a trifluoromethyl group, contain an aliphatic alkyl group at a terminal thereof, and do not contain an isothiocyanate group (NCS group).

In other words, the liquid crystal layer according to the third aspect may be the liquid crystal layer exemplified in the first aspect or the liquid crystal layer exemplified in the second aspect. Therefore, a detailed description of the liquid crystal layer according to the third aspect is omitted. Even in the liquid crystal layer according to the third aspect, it is also preferable that the dielectric anisotropy (Δε) be 10 or more. The liquid crystal layer (liquid crystal compound) is appropriate for, for example, the scanning antenna or the liquid crystal lens to be described later.

As described above, examples of the liquid crystal device including the liquid crystal panel P to which the combination of the liquid crystal layer and the alignment film according to the first to third aspects are applied can include a scanning antenna using a liquid crystal, a liquid crystal lens using a liquid crystal as an optical element, and the like. Next, the scanning antenna will be described as a specific example of the liquid crystal device in which the liquid crystal alignment agent is applied.

[Basic Structure of Scanning Antenna]

The scanning antenna has a beam scanning function that can change a direction of a beam and has a structure in which it includes antenna units that use high anisotropy (birefringence) of a dielectric constant m($\varepsilon_m$) of a liquid crystal material. The scanning antenna controls a voltage applied to a liquid crystal layer of each antenna unit to change an effective dielectric constant m($\varepsilon_m$) of the liquid crystal layer of each antenna unit, thereby forming a two-dimensional pattern by the antenna units having different capacitances. Since the dielectric constant of the liquid crystal material has frequency dispersion, a dielectric constant in a frequency band of a microwave is particularly referred to as a "dielectric constant m($\varepsilon_m$)" in the present description.

Electromagnetic waves (for example, microwaves) emitted from the scanning antenna or received by the scanning antenna are given a phase difference corresponding to a capacitance of each antenna unit to have a strong directivity in a specific direction depending on the two-dimensional pattern formed by the antenna units having the different capacitances (beam scanning). For example, the electromagnetic waves emitted from the scanning antenna can be obtained by integrating spherical waves obtained by allowing input electromagnetic waves to be incident to each antenna unit and scattering the incident input electromagnetic waves by each antenna unit in consideration of the phase difference given by each antenna unit.

Figure 2:
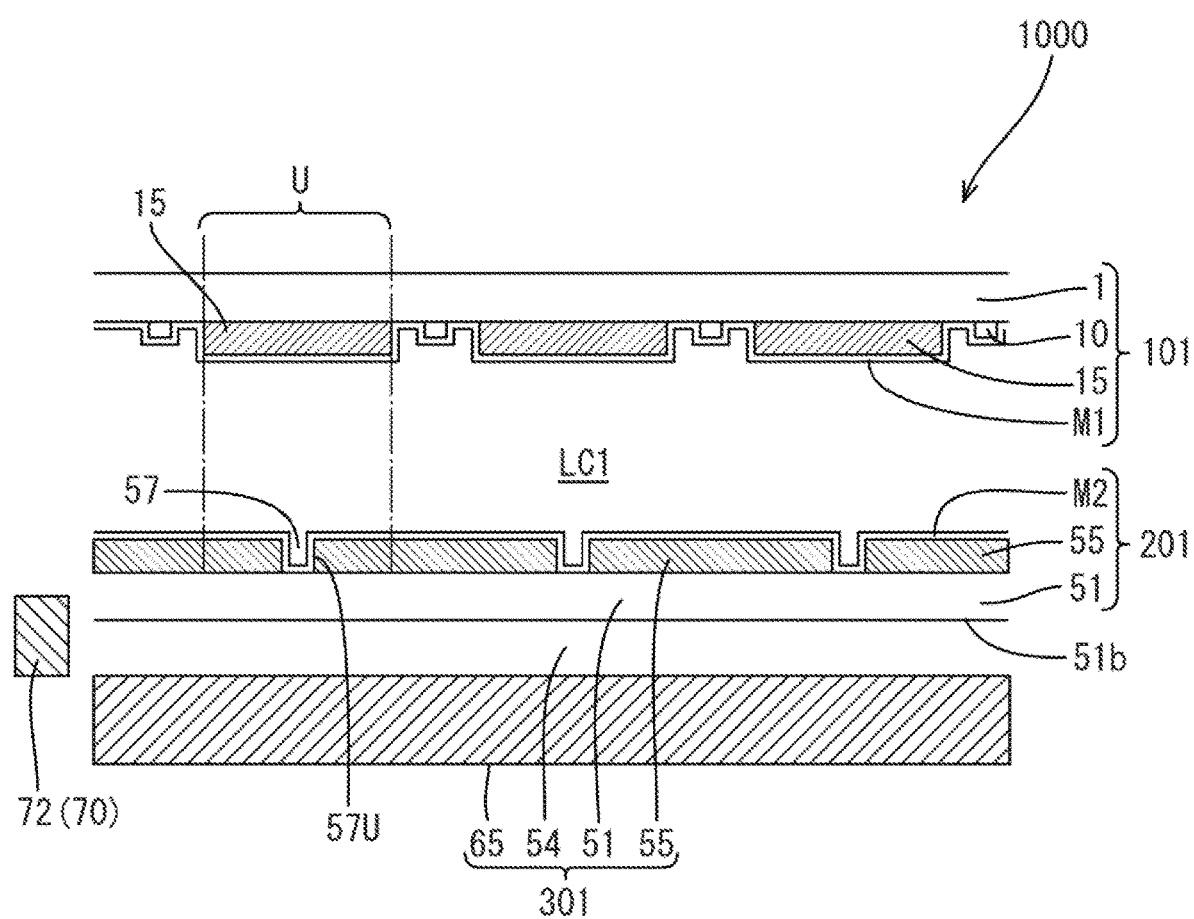
FIG. 2 is a cross-sectional view schematically showing a part of a scanning antenna according to an embodiment.

Here, a basic structure of a scanning antenna according to an embodiment of the present invention will be described with reference to FIG. 2 and the like. FIG. 2 is a cross-sectional view schematically showing a part of a scanning antenna 1000 according to an embodiment. The scanning antenna 1000 according to the present embodiment is a radial inline slot antenna in which slots 57 are arranged in a concentric shape. In FIG. 2, a part of a cross section taken along a radial direction from a feeding pin 72 provided in the vicinity of the center of the slots arranged in the concentric shape is schematically shown. In another embodiment, an array of the slots may be various known arrays (for example, a spiral shape or a matrix shape).

The scanning antenna 1000 mainly includes a thin film transistor (TFT) substrate 101 (an example of the first substrate 100), a slot substrate 201 (an example of the second substrate 200), a liquid crystal layer LC1 (an example of the liquid crystal layer LC) disposed between the TFT substrate 101 and the slot substrate 201, and a reflective conductive plate 65. The scanning antenna 1000 is configured to transmit and receive microwaves to and from the TFT substrate 101. The TFT substrate 101 and the slot substrate 201 are disposed so as to face each other with the liquid crystal layer LC1 interposed therebetween.

The TFT substrate 101 includes a dielectric substrate (an example of a first dielectric substrate and the first support substrate) 1 such as a glass substrate, patch electrodes 15 and thin film transistors (TFTs) 10 formed on a surface of the dielectric substrate 1 facing the liquid crystal layer LC1, and an alignment film M1 (an example of the alignment film M and the first alignment film) formed on the outermost surface facing the liquid crystal layer LC1. A gate bus line and a source bus line (not shown in FIG. 2) are connected to each TFT 10.

The slot substrate 201 includes a dielectric substrate (an example of a second dielectric substrate and the second support substrate) 51 such as a glass substrate, a slot electrode 55 formed on a surface of the dielectric substrate 51 facing the liquid crystal layer LC1, and an alignment film M2 (an example of the alignment film M and the second alignment film) formed on the outermost surface facing the liquid crystal layer LC1. The slot electrode 55 has slots 57.

It is preferable that the dielectric substrates 1 and 51 each used in the TFT substrate 101 and the slot substrate 201 have a small dielectric loss against microwaves, and in addition to the glass substrate, a plastic substrate can be used as the dielectric substrates 1 and 51. A thickness of each of the dielectric substrates 1 and 51 is not particularly limited, and is, for example, preferably, 400 μm or less, more preferably, 300 μm or less. A lower limit of the thickness of each of the dielectric substrates 1 and 51 is not particularly limited, and may be any value as long as each of the dielectric substrates 1 and 51 has strength enough to withstand in a producing process and the like.

The reflective conductive plate 65 is disposed so as to face the slot substrate 201 with an air layer 54 interposed therebetween. In another embodiment, a layer formed of a dielectric (for example, a fluororesin such as polytetrafluoroethylene (PTFE)) having a small dielectric constant m for microwaves may be used instead of the air layer 54. In the scanning antenna 1000 according to the present embodiment, the slot electrode 55, the reflective conductive plate 65, and the dielectric substrate 51 and the air layer 54 between the slot electrode 55 and the reflective conductive plate 65 function as a waveguide 301.

The patch electrode 15, a portion (hereinafter, also referred to as a "slot electrode unit 57U") of the slot electrode 55 including the slot 57, and the liquid crystal layer LC1 between the patch electrode 15 and the slot electrode unit 57U constitute an antenna unit U. In each antenna unit U, one island-shaped patch electrode 15 faces one hole-shaped slot 57 (slot electrode unit 57U) with the liquid crystal layer LC1 interposed therebetween, such that a liquid crystal capacitance is configured. In the scanning antenna 1000 according to the present embodiment, antenna units U are arranged in a concentric shape. It should be noted that the antenna unit U includes an auxiliary capacitance electrically connected in parallel with the liquid crystal capacitance.

The slot electrode 55 constitutes the antenna unit U in each slot electrode unit 57U, and also functions as a wall of the waveguide 301. For this reason, the slot electrode 55 needs to have a function of suppressing transmission of the microwaves, and is formed of a relatively thick metal layer. Examples of the metal layer can include a copper (Cu) layer, an aluminum (Al) layer, and the like. For example, in order to reduce a microwave of 10 GHz up to 1/150, a thickness of the Cu layer is set to 3.3 μm or more, and a thickness of the Al layer is set to 4.0 μm or more. In addition, in order to reduce a microwave of 30 GHz up to 1/150, a thickness of the Cu layer is set to 1.9 μm or more, and a thickness of the Al layer is set to 2.3 μm or more. An upper limit of a thickness of the metal layer constituting the slot electrode 55 is not particularly limited, but it can be preferable that the thickness of the metal layer be as small as possible in consideration of the formation of the alignment film M2 as described below. When the Cu layer is used as the metal layer, there is an advantage that the Cu layer can be made thinner than the Al layer. As a method of forming the slot electrode 55, other methods such as a thin film deposition method used in technology of a liquid crystal display device according to the related art or a method of attaching a metal foil (for example, a Cu foil or an Al foil) onto a substrate may be used. A thickness of the metal layer is set to, for example, 2 μm or more to 30 μm or less. In addition, in a case of forming the metal layer by the thin film deposition method, the thickness of the metal layer is set to, for example, 5 μm or less. For example, an aluminum plate, a copper plate, or the like having a thickness of several millimeters can be used as the reflective conductive plate 65.

Since the patch electrode 15 does not constitute the waveguide 301 unlike the slot electrode 55, the patch electrode 15 is formed of a metal layer having a thickness smaller than that of the slot electrode 55. It is preferable that a resistance of the patch electrode 15 be low in order to avoid loss that vibrations of free electrons in the patch electrode 15 are changed into heat when vibrations of free electrons in the vicinity of the slot 57 of the slot electrode 55 cause the vibrations of the free electrons in the patch electrode 15. In terms of mass productivity and the like, it is more preferable to use an Al layer than to use a Cu layer, and it is preferable that a thickness of the Al layer be, for example, 0.5 μm or more to 2 μm or less.

An array pitch of the antenna units U is set to, for example, λ/4 or less and/or λ/5 or less in which λ is a wavelength of the microwave. The wavelength λ is, for example, 25 mm, and the array pitch in this case is set to, for example, 6.25 mm or less and/or 5 mm or less.

The scanning antenna 1000 changes phases of microwaves excited (re-radiated) from each patch electrode 15 by changing a capacitance value of the liquid crystal capacitance of the antenna unit U. Therefore, as a liquid crystal material of the liquid crystal layer LC1, a preferable liquid crystal material has large anisotropy $\Delta\varepsilon_m$ of a dielectric constant $m(\varepsilon_m)$ for the microwave and/or small $\tan \delta_m$ (dielectric loss tangent for the microwave). For example, a liquid crystal material of which $\Delta\varepsilon_m$ is 4 or more and $\tan \delta_M$ is 0.02 or less (both of them are values of 19 Gz) as described in SID 2015 DIGEST pp. 824 to 826 written by M. Wittek et al. can be appropriately used. In addition to this material, a liquid crystal material of which $\Delta\varepsilon_m$ is 0.4 or more and $\tan \delta_m$ is 0.04 or less as described in Polymer 55 vol. August, pp. 599 to 602 (2006) written by Kuki can be used.

Although the dielectric constant of the liquid crystal material generally has frequency dispersion, the dielectric anisotropy $\Delta\varepsilon_m$ for the microwave has a positive correlation with refractive index anisotropy Δn for visible light. For this reason, it can be said that it is preferable that a liquid crystal material for the antenna unit for the microwave be a material having a large refractive index anisotropy Δn for the visible light. Here, when Δn (birefringence) for light of 550 nm is used as an index, a nematic liquid crystal of which Δn is 0.3 or more, preferably 0.4 or more is used for the antenna unit for the microwave. An upper limit of Δn is not particularly limited. A thickness of the liquid crystal layer LC1 is set to, for example, 1 μm or more to 500 μm or less.

Figure 3:
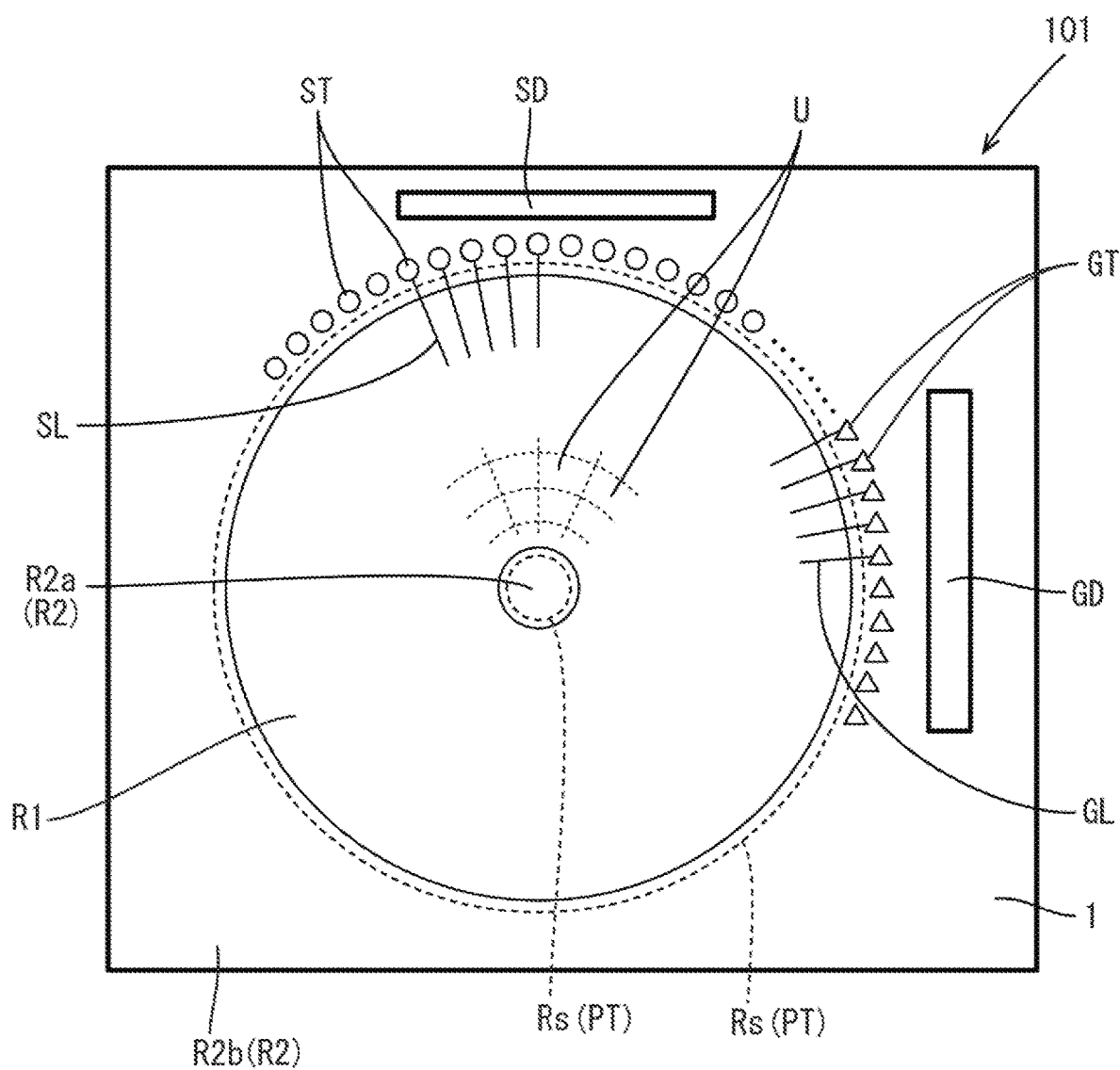
FIG. 3 is a plan view schematically showing a thin film transistor (TFT) substrate included in the scanning antenna.
Figure 4:
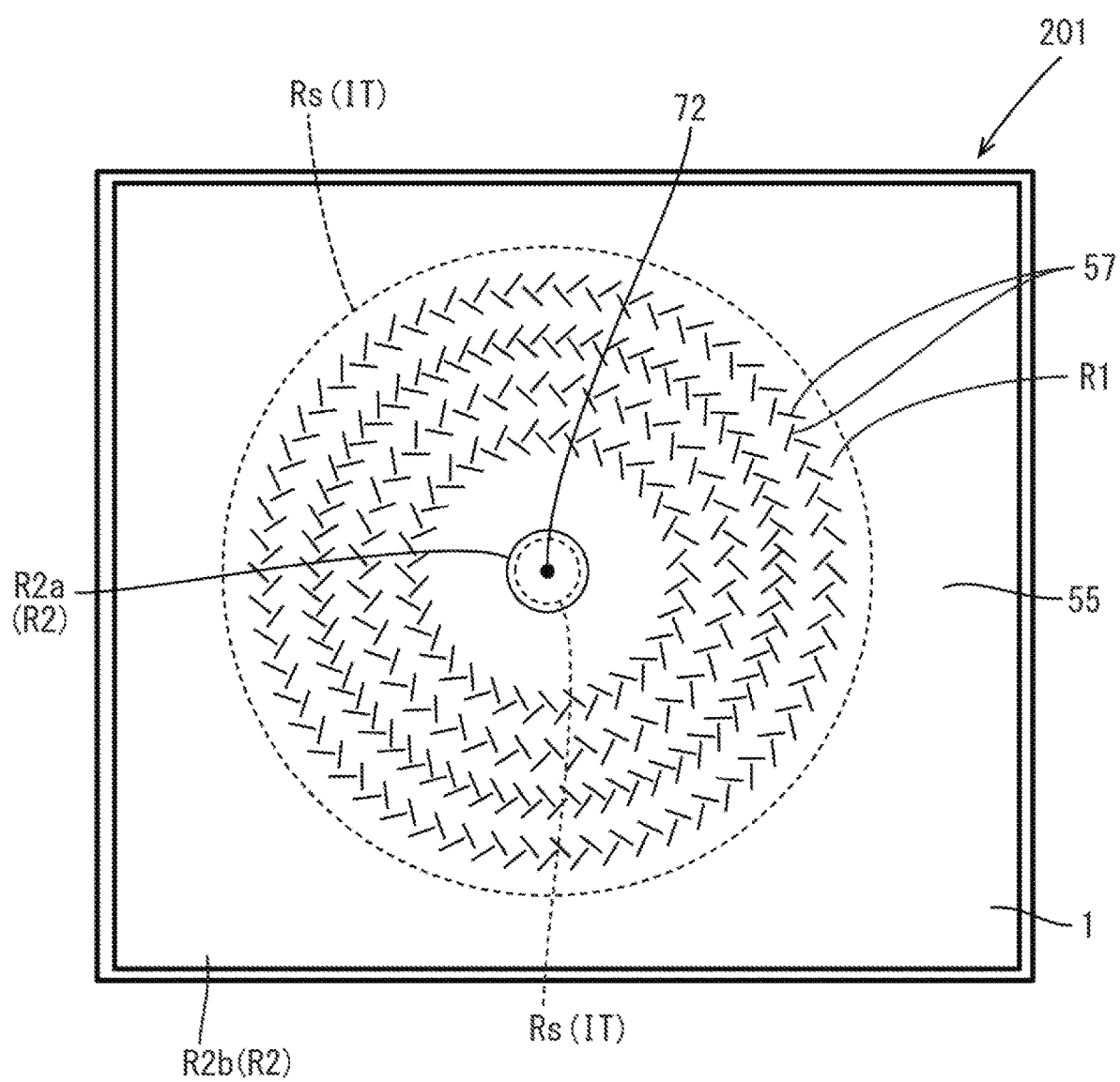
FIG. 4 is a plan view schematically showing a slot substrate included in the scanning antenna.

FIG. 3 is a plan view schematically showing the TFT substrate 101 included in the scanning antenna 1000, and FIG. 4 is a plan view schematically showing the slot substrate 201 included in the scanning antenna 1000. It should be noted that a region of the TFT substrate 101 and a region of the slot substrate 201 that correspond to the antenna unit U are together referred to as an "antenna unit region" for convenience of explanation, and the same reference symbols as that of the antenna unit are used as reference symbols of the antenna unit region. As shown in FIGS. 3 and 4, in the TFT substrate 101 and the slot substrate 201, a region defined by antenna unit regions U that are two-dimensionally arranged is referred to as a "transmission/reception region R1", and a region other than the transmission/reception region R1 is referred to as a "non-transmission/reception region R2". In the non-transmission/reception region R2, a terminal portion, a drive circuit, and the like are arranged.

The transmission/reception region R1 has a ring shape when viewed in a plane. The non-transmission/reception region R2 includes a first non-transmission/reception region R2a positioned at a central portion of the transmission/reception region R1 and a second non-transmission/reception region R2b disposed at a circumference of the transmission/reception region R1. An outer diameter of the transmission/reception region R1 is, for example, 200 mm or more to 1,500 mm or less, and is appropriately set depending on a communication amount or the like.

Gate bus lines GL and source bus lines SL supported by the dielectric substrate 1 are provided on the transmission/reception region R1 of the TFT substrate 101, and driving of each antenna unit region U is controlled by using these wirings. Each antenna unit region U includes the TFT 10 and the patch electrode 15 electrically connected to the TFT 10. A source electrode of the TFT 10 is electrically connected to a source bus line SL, and a gate electrode of the TFT 10 is electrically connected to a gate bus line GL. In addition, a drain electrode of the TFT 10 is electrically connected to the patch electrode 15.

In the non-transmission/reception region R2 (the first non-transmission/reception region R2a and the second non-transmission/reception region R2b), seal regions Rs in which a sealant (not shown) is formed so as to surround the transmission/reception region R1 are arranged. The sealant has a function of adhering the TFT substrate 101 and the slot substrate 201 to each other and sealing the liquid crystal material (liquid crystal layer LC) between the TFT substrate 101 and the slot substrate 201, or the like.

Gate terminal portions GT, a gate driver GD, source terminal portions ST, and a source driver SD are arranged outside the seal region Rs of the non-transmission/reception region R2. Each gate bus line GL is connected to the gate driver GD through the gate terminal portion GT, and each source bus line SL is connected to the source driver SD through the source terminal portion ST. It should be noted that both of the source driver SD and the gate driver GD are formed on the dielectric substrate 1 of the TFT substrate 101 in the present embodiment, but one or both of the source driver SD and the gate driver GD may also be formed on the dielectric substrate 51 of the slot substrate 201.

In addition, transfer terminal portions PT are provided in the non-transmission/reception region R2. The transfer terminal portions PT are electrically connected to the slot electrode 55 of the slot substrate 201. In the present embodiment, the transfer terminal portions PT are arranged in both of the first non-transmission/reception region R2a and the second non-transmission/reception region R2b. In another embodiment, the transfer terminal portions PT may be arranged in only any one of the first non-transmission/reception region R2a and the second non-transmission/reception region R2b. In addition, in the present embodiment, the transfer terminal portions PT are arranged in the seal regions Rs. For this reason, a conductive resin containing conductive particles (conductive beads) is used as the sealant.

As shown in FIG. 4, in the slot substrate 201, the slot electrode 55 is formed over the transmission/reception region R1 and the non-transmission/reception region R2 on the dielectric substrate 51. In FIG. 4, a surface of the slot substrate 201 viewed from the liquid crystal layer LC1 is shown, and for convenience of explanation, the alignment film M2 formed on the outermost surface is omitted.

In the transmission/reception region R1 of the slot substrate 201, slots 57 are arranged in the slot electrode 55. These slots 57 are assigned one by one to the antenna unit regions U of the TFT substrate 101, respectively. In the present embodiment, the slots 57 including a pair of slots 57 extending in directions substantially orthogonal to each other are arranged in a concentric shape so as to form the radial inline slot antenna. Since the scanning antenna 1000 has such a pair of slots 57, the scanning antenna 1000 can transmit and receive circularly polarized waves.

In the non-transmission/reception region R2 of the slot substrate 201, terminal portions IT of the slot electrode 55 are provided. The terminal portions IT are electrically connected to the transfer terminal portions PT of the TFT substrate 101. In the present embodiment, the terminal portions IT are arranged in the seal regions Rs, and are electrically connected to the corresponding transfer terminal portions PT by the sealant formed of the conductive resin containing the conductive particles (conductive beads), as described above.

In addition, in the first non-transmission/reception region R2a, the feeding pin 72 is provided so as to be disposed at the center of a concentric circle formed by the slots 57. The microwaves are supplied to the waveguide 301 constituted by the slot electrode 55, the reflective conductive plate 65, and the dielectric substrate 51 by the feeding pin 72. The feeding pin 72 is connected to a feeding device 70. A feeding manner may be any one of a direct-coupling feeding manner and an electromagnetic coupling feeding manner, or a known feeding structure can be adopted.

Hereinafter, the TFT substrate 101, the slot substrate 201, and the waveguide 301 will be described in detail.

(Structure of TFT Substrate 101)

Figure 5:
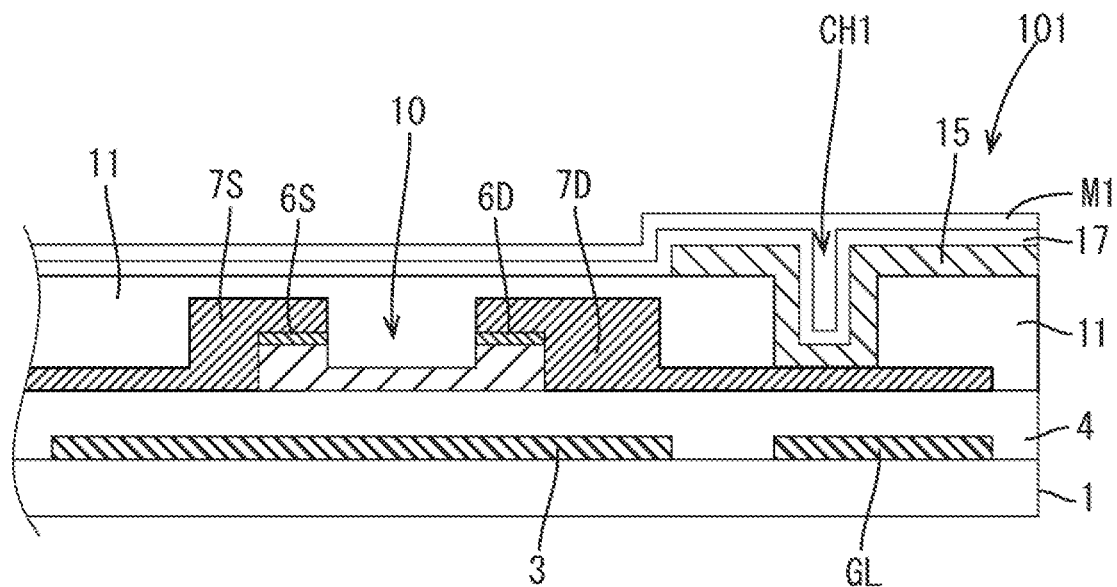
FIG. 5 is a cross-sectional view schematically showing an antenna unit region of the TFT substrate.
Figure 6:
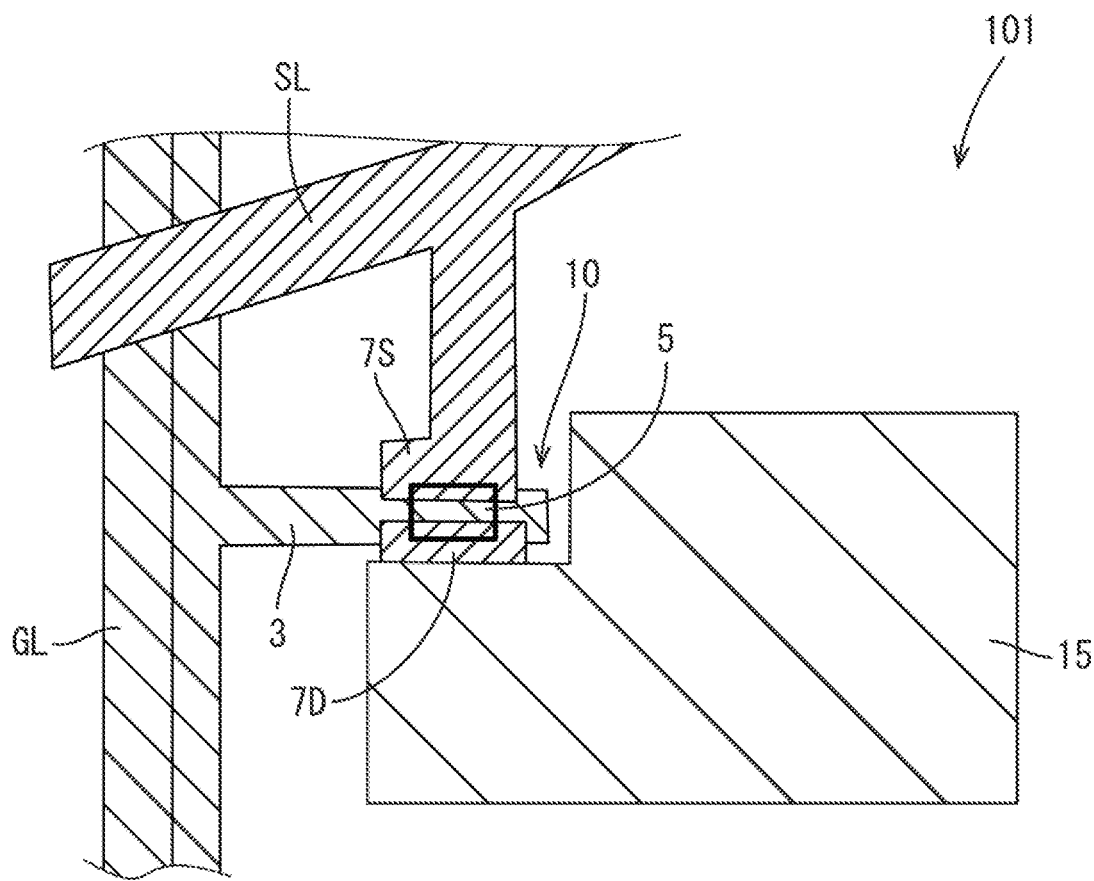
FIG. 6 is a plan view schematically showing the antenna unit region of the TFT substrate.

FIG. 5 is a cross-sectional view schematically showing the antenna unit region U of the TFT substrate 101, and FIG. 6 is a plan view schematically showing the antenna unit region U of the TFT substrate 101. In FIGS. 5 and 6, configurations of cross sections of a part of the transmission/reception region R1 are shown.

Each antenna unit region U of the TFT substrate 101 includes the dielectric substrate (first dielectric substrate) 1, the TFT 10 supported on the dielectric substrate 1, a first insulating layer 11 covering the TFT 10, the patch electrode 15 formed on the first insulating layer 11 and electrically connected to the TFT 10, a second insulating layer 17 covering the patch electrode 15, and the alignment film M1 covering the second insulating layer 17.

The TFT 10 includes a gate electrode 3, a semiconductor layer 5 having an island shape, a gate insulating layer 4 disposed between the gate electrode 3 and the semiconductor layer 5, a source electrode 7S, and a drain electrode 7D. The TFT 10 according to the present embodiment is a channel etch type TFT having a bottom gate structure. It should be noted that TFTs having other structures may be used in another embodiment.

The gate electrode 3 is electrically connected to the gate bus line GL, and receives a scanning signal supplied from the gate bus line GL. The source electrode 7S is electrically connected to the source bus line SL, and receives a data signal supplied from the source bus line SL. The gate electrode 3 and the gate bus line GL may be formed of the same conductive film (gate conductive film). In addition, the source electrode 7S, the drain electrode 7D, and the source bus line SL may be formed of the same conductive film (source conductive film). The gate conductive film and the source conductive film are, for example, metal films. A layer formed using the gate conductive film may be referred to as a "gate metal layer", and a layer formed using the source conductive film may be referred to as a "source metal layer".

The semiconductor layer 5 is disposed so as to overlap with the gate electrode 3 with the gate insulating layer 4 interposed therebetween. As shown in FIG. 5, a source contact layer 6S and a drain contact layer 6D are formed on the semiconductor layer 5. The source contact layer 6S and the drain contact layer 6D are disposed, respectively, at both sides of a region (channel region) in which a channel is formed in the semiconductor layer 5, so as to face each other. In the present embodiment, the semiconductor layer 5 is an intrinsic amorphous silicon (i-a-Si) layer, and the source contact layer 6S and the drain contact layer 6D are an n+-type amorphous silicon (n+-a-Si) layer. It should be noted that the semiconductor layer 5 may be a polysilicon layer, an oxide semiconductor layer, or the like, in another embodiment.

The source electrode 7S is provided so as to be in contact with the source contact layer 6S, and is connected to the semiconductor layer 5 through the source contact layer 6S. The drain electrode 7D is provided so as to be in contact with the drain contact layer 6D, and is connected to the semiconductor layer 5 through the drain contact layer 6D.

The first insulating layer 11 has a contact hole CH1 reaching the drain electrode 7D of the TFT 10.

The patch electrode 15 is provided on the first insulating layer 11 and in the contact hole CH1, and is in contact with the drain electrode 7D in the contact hole CH1. The patch electrode 15 is mainly formed of a metal layer. It should be noted that the patch electrode 15 may be a metal electrode formed of only a metal layer. A material of the patch electrode 15 may be the same as those of the source electrode 7S and the drain electrode 7D. A thickness of the metal layer in the patch electrode 15 (a thickness of the patch electrode 15 in a case where the patch electrode 15 is the metal electrode) may be the same as those of the source electrode 7S and the drain electrode 7D, but is preferably larger than those of the source electrode 7S and the drain electrode 70. When the thickness of the patch electrode 15 is large, transmittance of the electromagnetic wave is suppressed to be low, such that a sheet resistance of the patch electrode is reduced, and loss that vibrations of free electrons in the patch electrode are changed to heat is reduced.

In addition, a CS bus line CL may be provided using the same conductive film as that of the gate bus line GL. The CS bus line CL may be disposed so as to overlap with the drain electrode 7D (or an extending portion of the drain electrode 7D) with the gate insulating layer 4 interposed therebetween to constitute an auxiliary capacitance CS having the gate insulating layer 4 as a dielectric layer.

In the present embodiment, the patch electrode 15 is formed in a layer different from the source metal layer. For this reason, a thickness of the source metal layer and a thickness of the patch electrode 15 can be controlled independently of each other.

The patch electrode 15 may include a Cu layer or an Al layer as a main layer. Performance of the scanning antenna is correlated with an electric resistance of the patch electrode 15, such that a thickness of the main layer of the patch electrode 15 is set so as to obtain a desired resistance. It is preferable that the patch electrode 15 have a resistance low enough not to hinder vibrations of electrons. The thickness of the metal layer in the patch electrode 15 is set to, for example, 0.5 μm or more when the metal layer is an Al layer.

The alignment film M1 is formed by using the liquid crystal alignment agent described above.

The TFT substrate 101 is produced by, for example, a method to be described below. First, the dielectric substrate 1 is prepared. For example, a glass substrate, a plastic substrate having heat resistance, or the like can be used as the dielectric substrate 1. The gate metal layer including the gate electrode 3 and the gate bus line GL is formed on the dielectric substrate 1.

The gate electrode 3 can be formed integrally with the gate bus line GL. Here, the gate conductive film (of which a thickness is, for example, 50 nm or more to 500 nm or less) is formed on the dielectric substrate 1 by a sputtering method or the like. Then, the gate electrode 3 and the gate bus line GL are formed by patterning the gate conductive film. A material of the gate conductive film is not particularly limited, and can be a metal such as aluminum (Al), tungsten (W), molybdenum (Mo), tantalum (Ta), chromium (Cr), titanium (Ti), copper (Cu), or the like, or alloys or nitrides thereof. Here, a laminated film in which MoN (of which a thickness is, for example, 50 nm), Al (of which a thickness is, for example, 200 nm), and MoN (of which a thickness is, for example, 50 nm) are sequentially laminated is formed as the gate conductive film.

Then, the gate insulating layer 4 is formed so as to cover the gate metal layer. The gate insulating layer 4 can be formed by a chemical vapor deposition (CVD) method or the like. A silicon oxide ($SiO_2$) layer, a silicon nitride (SiNx) layer, a silicon oxynitride (SiOxNy; x>y) layer, a silicon nitride oxide (SiNxOy; x>y) layer, or the like may be appropriately used as the gate insulating layer 4. The gate insulating layer 4 may have a laminated structure. Here, a SiNx layer (of which a thickness is, for example, 410 nm) is formed as the gate insulating layer 4.

Then, the semiconductor layer 5 and a contact layer are formed on the gate insulating layer 4. Here, the semiconductor layer 5 having the island shape and the contact layer are obtained by sequentially forming and patterning an intrinsic amorphous silicon film (of which a thickness is, for example, 125 nm) and an n+-type amorphous silicon film (of which a thickness is, for example, 65 nm). It should be noted that a semiconductor film used in the semiconductor layer 5 is not limited to the amorphous silicon film. For example, an oxide semiconductor layer may be formed as the semiconductor layer 5. In this case, the contact layer may not be provided between the semiconductor layer 5 and the source and drain electrodes.

Then, the source metal layer including the source electrode 7S, the drain electrode 7D, and the source bus line SL is formed by forming the source conductive film (of which a thickness is, for example, 50 nm or more to 500 nm or less) on the gate insulating layer 4 and the contact layer and patterning the source conductive film. In this case, the contact layer is also etched, such that the source contact layer 6S and the drain contact layer 6D separated from each other are formed.

A material of the source conductive film is not particularly limited, and can be a metal such as aluminum (Al), tungsten (W), molybdenum (Mo), tantalum (Ta), chromium (Cr), titanium (Ti), copper (Cu), or the like, or alloys or nitrides thereof. Here, a laminated film in which MoN (of which a thickness is, for example, 30 nm), Al (of which a thickness is, for example, 200 nm), and MoN (of which a thickness is, for example, 50 nm) are sequentially laminated is formed as the source conductive film.

Here, the source conductive film is formed by, for example, a sputtering method, and patterning (source/drain separation) of the source conductive film is performed by wet etching. Then, a portion of the contact layer positioned on a region that becomes the channel region of the semiconductor layer 5 is removed by, for example, dry etching to form a gap portion, thereby separating the contact layer into the source contact layer 6S and the drain contact layer 6D. In this case, in the gap portion, the vicinity of a surface of the semiconductor layer 5 is also etched (overetching).

Then, the first insulating layer 11 is formed so as to cover the TFT 10. In this example, the first insulating layer 11 is disposed so as to be in contact with the channel region of the semiconductor layer 5. In addition, the contact hole CH1 reaching the drain electrode 7D is formed in the first insulating layer 11 by a known photolithography technology.

The first insulating layer 11 may be an inorganic insulating layer such as a silicon oxide ($SiO_2$) film, a silicon nitride (SiNx) film, a silicon oxynitride (SiOxNy; x>y) film, a silicon nitride oxide (SiNxOy; x>y) film, or the like. Here, a SiNx layer having a thickness of, for example, 330 nm is formed as the first insulating layer 11 by, for example, a CVD method.

Then, a patch conductive film is formed on the first insulating layer 11 and in the contact hole CH1, and is patterned. As a result, the patch electrode 15 is formed in the transmission/reception region R1. It should be rioted that a patch connection portion formed of the same conductive film (patch conductive film) as that of the patch electrode 15 is formed in the non-transmission/reception region R2. The patch electrode 15 is in contact with the drain electrode 7D within the contact hole CH1.

The same material as that of the gate conductive film or the source conductive film can be used as a material of the patch conductive film. However, it is preferable that the patch conductive film be set to be thicker than the gate conductive film and the source conductive film. An appropriate thickness of the patch conductive film is, for example, 1 μm or more to 30 μm or less. When the thickness of the patch conductive film is smaller than 1 μm, transmittance of the electromagnetic wave becomes about 30%, and a sheet resistance becomes 0.03 Ω/sq or more, such that it is likely that loss will be increased, and the thickness of the patch conductive film is larger than 30 μm, it is likely that patterning characteristics of the slot 57 will be deteriorated.

Here, a laminated film (MoN/Al/MoN) in which MoN (of which a thickness is, for example, 50 nm), Al (of which a thickness is, for example, 1000 nm), and MoN (of which a thickness is, for example, 50 nm) are sequentially laminated is formed as the patch conductive film.

Then, the second insulating layer (of which a thickness is, for example, 100 nm or more to 300 nm or less) 17 is formed on the patch electrode 15 and the first insulating layer 11. The second insulating layer 17 is not particularly limited, and can be, for example, a silicon oxide (SiO$_2$) film, a silicon nitride (SiNx) film, a silicon oxynitride (SiOxNy; x>y) film, a silicon nitride oxide (SiNxOy; x>y) film, or the like. Here, for example, a SiNx layer having a thickness of 200 nm is formed as the second insulating layer 17.

Then, inorganic insulating films (the second insulating layer 17, the first insulating layer 11, and the gate insulating layer 4) are collectively etched by, for example, dry etching using a fluorine-based gas. In the etching, the patch electrode 15, the source bus line SL, and the gate bus line GL function as an etch stop. Therefore, a second contact hole reaching the gate bus line GL is formed in the second insulating layer 17, the first insulating layer 11, and the gate insulating layer 4, and a third contact hole reaching the source bus line SL is formed in the second insulating layer 17 and the first insulating layer 11. In addition, a fourth contact hole reaching the patch connection portion described above is formed in the second insulating layer 17.

Then, a conductive film (of which a thickness is 50 nm or more to 200 nm or less) is formed on the second insulating layer 17 and in the second contact hole, the third contact hole, and the fourth contact hole by, for example, a sputtering method. A transparent conductive film such as an indium tin oxide (ITO) film, an IZO film, a zinc oxide film (ZnO film), or the like can be used as the conductive film. Here, an ITO film having a thickness of, for example, 100 nm is used as the conductive film.

Then, an upper connection portion for a gate terminal, an upper connection portion for a source terminal, and an upper connection portion for a transfer terminal are formed by patterning the transparent conductive film. The upper connection portion for a gate terminal, the upper connection portion for a source terminal, and the upper connection portion for a transfer terminal are used in order to protect the electrodes or wirings exposed at each terminal portion. In this way, the gate terminal portion GT, the source terminal portion ST, and the transfer terminal portion PT are obtained.

Then, a coated film is formed to cover the second insulating layer 17 or the like by using the liquid crystal alignment agent described above, a solvent is removed by heating the coated film, and then the coated film is subjected to a predetermined alignment processing (for example, photo alignment processing), thereby forming the alignment film M1. In this way, the TFT substrate 101 can be produced.

(Structure of Slot Substrate 201)

Figure 7:
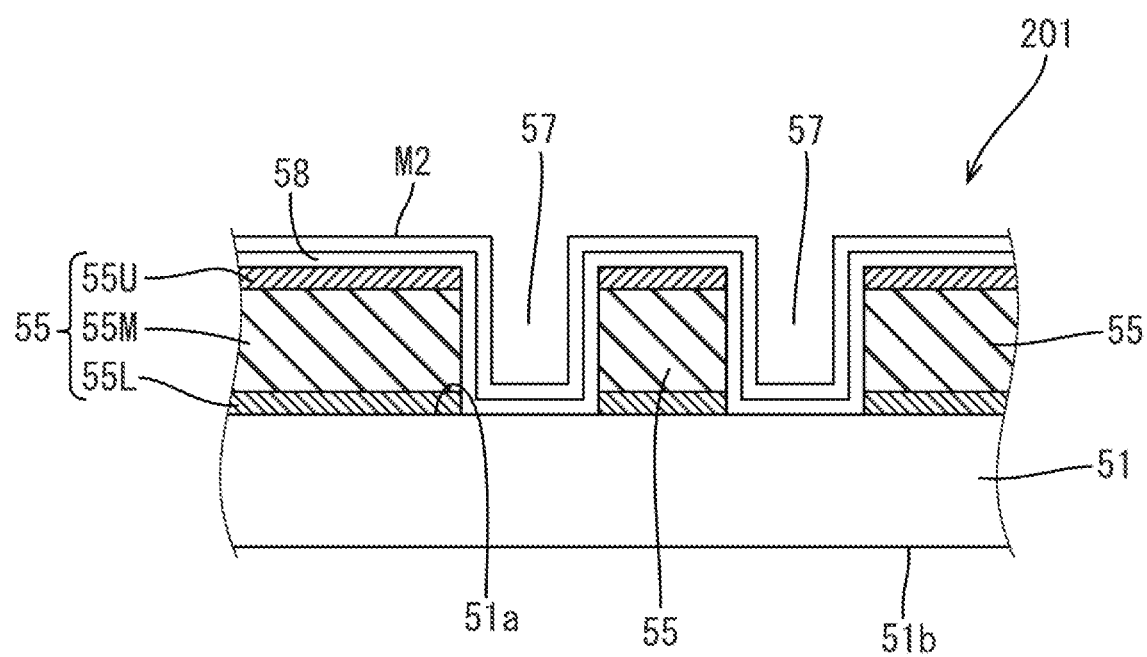
FIG. 7 is a cross-sectional view schematically showing an antenna unit region of the slot substrate.

Next, a structure of the slot substrate 201 will be described in more detail. FIG. 7 is a cross-sectional view schematically showing the antenna unit region U of the slot substrate 201.

The slot substrate 201 mainly includes the dielectric substrate (an example of the second dielectric substrate and the second substrate 200) 51, the slot electrode 55 formed on one plate surface (a plate surface facing the liquid crystal layer or a plate surface facing the TFT substrate 101) 51a of the dielectric substrate 51, a third insulating layer 58 covering the slot electrode 55, and the alignment film M2 covering the third insulating layer 58.

In the transmission/reception region R1 of the slot substrate 201, the slots 57 are formed in the slot electrode 55 (see FIG. 4). The slot 57 is an opening (groove) penetrating through the slot electrode 55. In this example, one slot 57 is assigned to each antenna unit region U.

The slot electrode 55 includes a main layer 55M such as a Cu layer, an Al layer, or the like. The slot electrode 55 may have a laminated structure in which it includes the main layer 55M and an upper layer 55U and a lower layer 55L disposed with the main layer 55M interposed therebetween. A thickness of the main layer 55M may be set in consideration of a skin effect depending on a material, and may be, for example, 2 μm or more to 30 μm or less. The thickness of the main layer 55M is typically set to be larger than those of the upper layer 55U and the lower layer 55L.

In this example, the main layer 55M is a Cu layer, and the upper layer 55U and the lower layer 55L are Ti layers. Adhesion between the slot electrode 55 and the dielectric substrate 51 can be improved by disposing the lower layer 55L between the main layer 55M and the dielectric substrate 51. In addition, corrosion of the main layer 55M (for example, the Cu layer) can be suppressed by providing the upper layer 55U.

The third insulating layer 58 is formed on the slot electrode 55 and in the slot 57. A material of the third insulating layer 58 is not particularly limited, and can be, for example, a silicon oxide (SiO$_2$) film, a silicon nitride (SiNx) film, a silicon oxynitride (SiOxNy; x>y) film, or a silicon nitride oxide (SiNxOy; x>y) film, or the like.

The alignment film M2 is formed by using the liquid crystal alignment agent described above, similarly to the alignment film M1 of the TFT substrate 101.

It should be noted that the terminal portions IT are provided in the non-transmission/reception region R2 of the slot substrate 201 (see FIG. 4). The terminal portion IT includes a part of the slot electrode 55, the third insulating layer 58 covering a part of the slot electrode 55, and an upper connection portion. The third insulating layer 58 has an opening (contact hole) reaching a part of the slot electrode 55. The upper connection portion is in contact with a part of the slot electrode 55 in the opening. In the present embodiment, the terminal portion IT is formed of a conductive layer such as an ITO film, an IZO film, or the like, is disposed in the seal region Rs, and is connected to the transfer terminal portion PT in the TFT substrate 101 by a seal resin containing conductive particles (for example, conductive beads such as Au beads, or the like).

The slot substrate 201 is produced by, for example, a method to be described below. First, the dielectric substrate 51 is prepared. A substrate having a high transmittance (a dielectric constant and a dielectric loss are small) for the electromagnetic wave, such as a glass substrate, a resin substrate, or the like can be used as the dielectric substrate 51. It is preferable that the dielectric substrate 51 be as thin as possible in order to suppress attenuation of the electromagnetic wave. For example, after components such as the slot electrode 55 and the like are formed on a surface of the glass substrate by a process to be described below, the glass substrate may be thinned from a back surface side thereof. As a result, a thickness of the glass substrate can be set to, for example, 500 μm or less. In general, a resin has a smaller dielectric constant and dielectric loss than those of a glass. When the dielectric substrate 51 is the resin substrate, a thickness of the dielectric substrate 51 is, for example, 3 μm or more to 300 μm or less. Polyimide or the like is used as a material of the resin substrate.

The slot electrode 55 having the slots 57 is obtained by forming a metal film on the dielectric substrate 51 and patterning the metal film. A Cu film (or an Al film) having a thickness of 2 μm or more to 5 μm or less may be used as the metal film. Here, a laminated film in which a Ti film, a Cu film, and a Ti film are sequentially laminated is used.

Then, the third insulating layer (of which a thickness is, for example, 100 nm or more to 200 nm or less) 58 is formed on the slot electrode 55 and in the slot 57. Here, the third insulating layer 58 is formed of a silicon oxide (Sift) film.

Then, in the non-transmission/reception region R2, the opening (contact hole) reaching a part of the slot electrode 55 is formed in the third insulating layer 58.

Then, a transparent conductive film is formed on the third insulating layer 58 and in the opening of the third insulating layer 58 and is patterned, such that an upper connection portion in contact with a part of the slot electrode 55 is formed in the opening, and a terminal portion IT for being connected to the transfer terminal portion PT of the TFT substrate 101 is obtained.

Then, a coated film is formed to cover the third insulating layer 58 by using the liquid crystal alignment agent described above, a solvent is removed by heating the coated film, and then the coated film is subjected to predetermined alignment processing (for example, photo alignment processing), thereby forming the alignment film M2. In this way, the slot substrate 201 can be produced.

(Configuration of Waveguide 301)

The waveguide 301 is configured such that the reflective conductive plate 65 faces the slot electrode 55 with the dielectric substrate 51 interposed therebetween. The reflective conductive plate 65 is disposed so as to face a back surface of the dielectric substrate 51 with the air layer 54 interposed therebetween. Since the reflective conductive plate 65 constitutes the wall of the waveguide 301, it is preferable that the reflective conductive plate 65 have a thickness of three times or more, preferably, five times or more the skin depth. For example, an aluminum plate, a copper plate, or the like produced by cutting and having a thickness of several millimeters can be used as the reflective conductive plate 65.

For example, when the scanning antenna 1000 performs transmission, the waveguide 301 guides the microwaves supplied from the feeding pin 72 disposed at the center of the antenna units U arranged in the concentric shape so as to radially spread outward. When the microwaves move along the waveguide 301, the microwaves are cut off at each slot 57 of each antenna unit U, such that an electric field is generated by a principle of a so-called slot antenna, and electric charges are induced in the slot electrode 55 by an action of the electric field (that is, the microwaves are converted into vibrations of free electrons in the slot electrode 55). In each antenna unit U, a phase of vibrations of free electrons induced in the patch electrode 15 is controlled by changing a capacitance value of a liquid crystal capacitance through alignment control of a liquid crystal. When the electric charges are induced in the patch electrode 15, the electric field is generated (that is, the vibrations of the free electrons in the slot electrode 55 move to the vibrations of the free electrons in the patch electrode 15), and microwaves (radio waves) oscillate from the patch electrode 15 of each antenna unit U toward an outer side of the TFT substrate 101. An azimuth angle of a beam is controlled by adding together the microwaves (radio waves) oscillating from each antenna unit U and having different phases.

In another embodiment, the waveguide may have a two-layer structure in which it is divided into an upper layer and a lower layer. In this case, the microwaves supplied from the feeding pin first move in the lower layer so as to radially spread from the center of the lower layer toward an outer side of the lower layer, ascend to the upper layer at an outer wall portion of the lower layer, and then move in the upper layer so as to gather from an outer side of the upper layer to the center of the upper layer. By adopting such a two-layer structure, it becomes easy to uniformly spread the microwaves over each antenna unit U.

Figure 8:
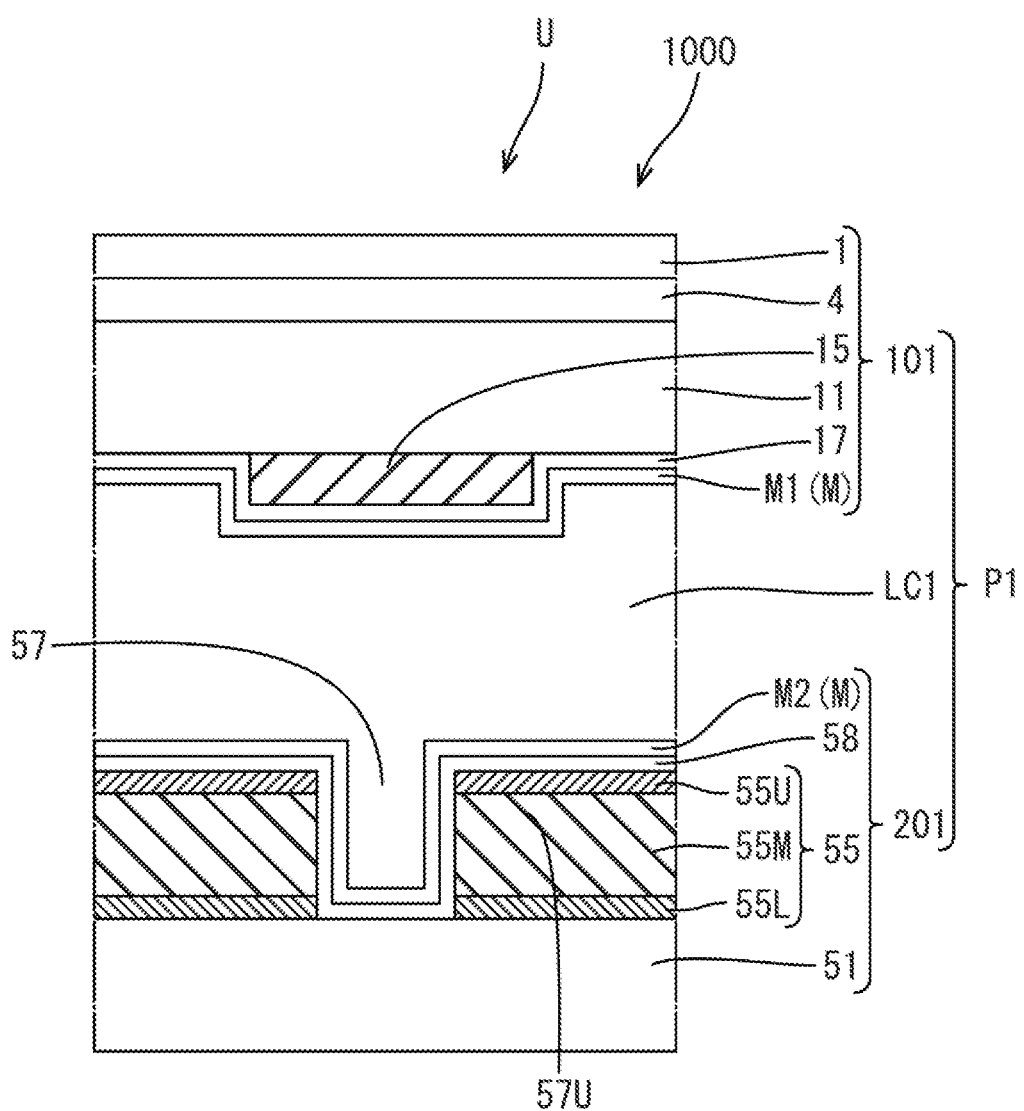
FIG. 8 is a cross-sectional view schematically showing a TFT substrate, a liquid crystal layer, and a slot substrate constituting an antenna unit of a scanning antenna.

FIG. 8 is a cross-sectional view schematically showing the TFT substrate 101, the liquid crystal layer LC1, and the slot substrate 201 constituting the antenna unit U of the scanning antenna 1000. As shown in FIG. 8, in the antenna unit U, the island-shaped patch electrode 15 of the TFT substrate 101, the hole-shaped (groove-shaped) slot 57 (slot electrode unit 57U) included in the slot electrode 55 of the slot substrate 201 face each other with the liquid crystal layer LC1 interposed therebetween. The scanning antenna 1000 includes a liquid crystal panel P1 including the liquid crystal layer LC1, a pair of TFT substrate 101 and slot substrate 201 disposed with the liquid crystal layer LC1 interposed therebetween and including the alignment films M1 and M2 formed on surfaces of the TFT substrate 101 and the slot substrate 201 facing the liquid crystal layer LC, respectively, by using the liquid crystal alignment agent described above. In the present description, the antenna unit U has a structure in which it includes one patch electrode 15 and the slot electrode 55 (slot electrode unit 57U) in which at least one slot 57 corresponding to the patch electrode 15 is disposed.

(Method of Producing Scanning Antenna)

At the time of producing the scanning antenna, the TFT substrate 101 and the slot substrate 201 are bonded to each other with the sealant interposed therebetween, and a process of filling the liquid crystal layer LC1 between the TFT substrate 101 and the slot substrate 201 is performed. The liquid crystal material (liquid crystal compound) constituting the liquid crystal layer LC1 may be filled between the TFT substrate 101 and the slot substrate 201 by a one drop fill (ODF) method or may be filled between the TFT substrate 101 and the slot substrate 201 by a vacuum injection method. In this way, the liquid crystal panel P1 of the scanning antenna 1000 including the liquid crystal layer LC1, the TFT substrate 101 and the slot substrate 201 can be obtained.

After the liquid crystal panel P1 is produced as described above, the reflective conductive plate 65 is appropriately assembled to the liquid crystal panel P1 so as to face an opposite surface 51b of the slot substrate 201 (second dielectric substrate 51) with the dielectric layer (air layer) 54 interposed therebetween. Through such processes, the scanning antenna according to the present embodiment is produced.

The liquid crystal panel according to the present embodiment can be used for the scanning antenna having the configuration as described above.

Next, the liquid crystal lens will be described as a specific example of the liquid crystal device to which the liquid crystal panel is applied.

[Basic Structure of Liquid Crystal Lens]

A liquid crystal lens 1000L is a liquid crystal optical element of which optical properties is made variable by using a liquid crystal, and can control a focal length by an applied voltage.

Figure 9:
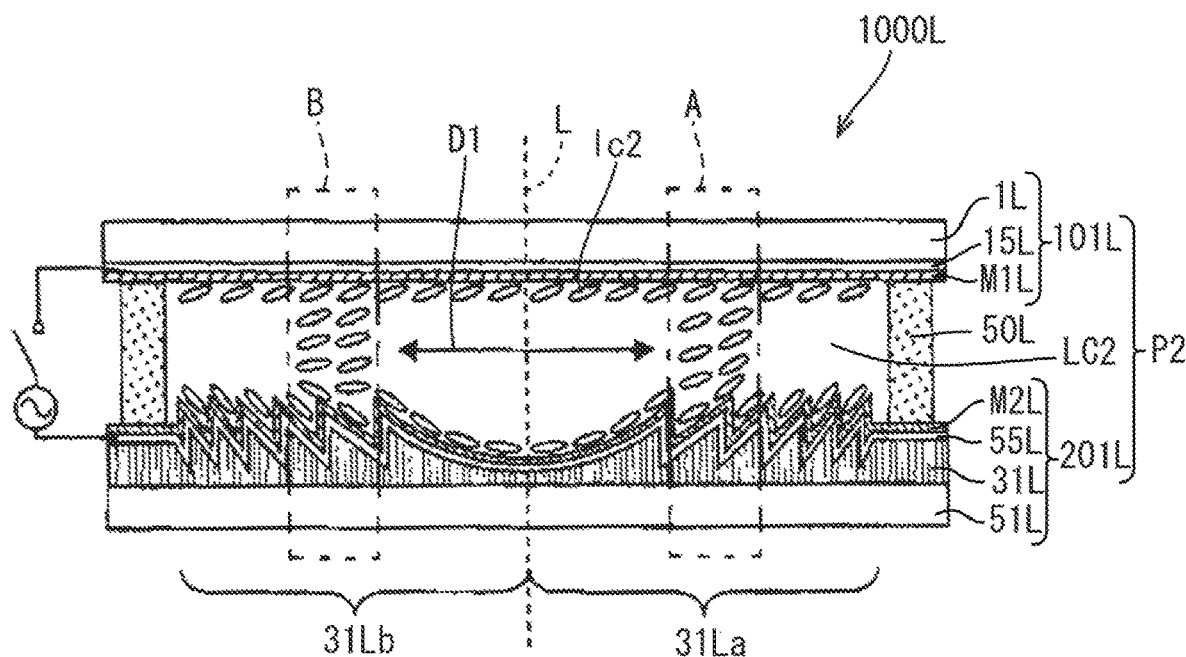
FIG. 9 is a cross-sectional view schematically showing a configuration of a liquid crystal lens in a state where a voltage is not applied.
Figure 10:
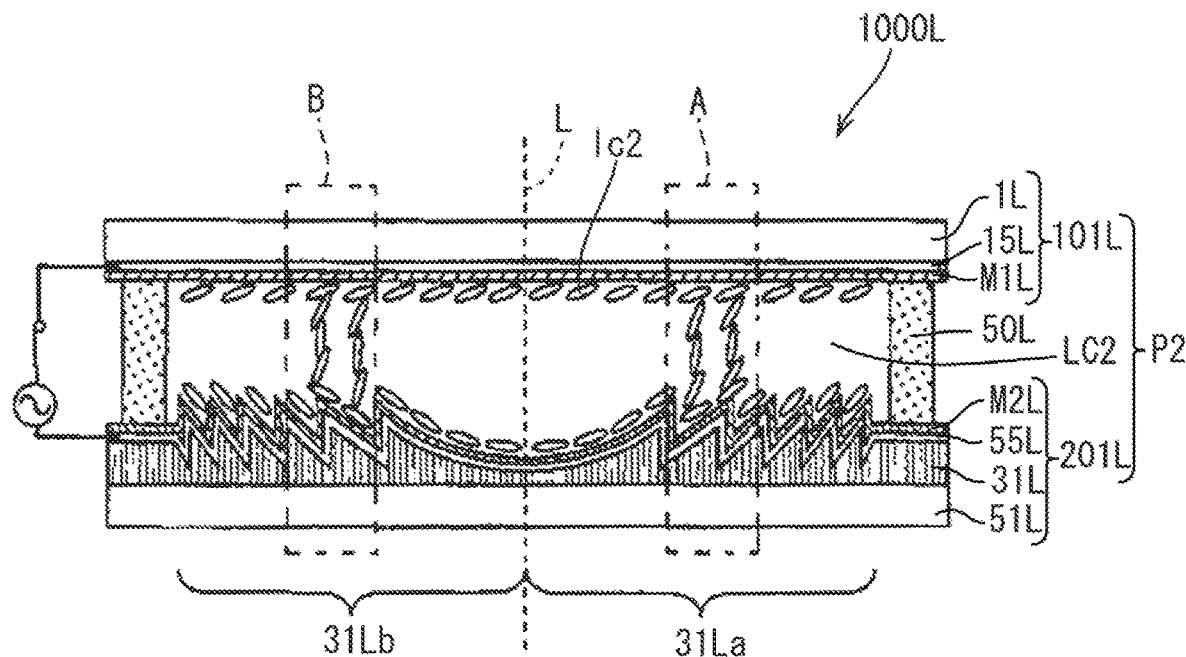
FIG. 10 is a cross-sectional view schematically showing a configuration of the liquid crystal lens in a state where a voltage is sufficiently applied such that a liquid crystal compound is switched.

FIG. 9 is a cross-sectional view schematically showing a configuration of the liquid crystal lens 1000L in a state where a voltage is not applied, and FIG. 10 is a cross-sectional view schematically showing a configuration of the liquid crystal lens 1000L in a state where a voltage is sufficiently applied such that a liquid crystal compound is switched. It should be noted that a liquid crystal compound (liquid crystal molecule) lc2 is illustrated only in a region A and a region B in FIGS. 9 and 10 for convenience of explanation.

The liquid crystal lens 1000L includes a liquid crystal panel P2 for the liquid crystal lens 1000L including a flat substrate 101L (an example of the first substrate 100), a lens-shaped substrate 201L (an example of the second substrate 200), and a liquid crystal layer LC2 (an example of the liquid crystal layer LC) disposed between the flat substrate 101L and the lens-shaped substrate 201L.

The flat substrate 101L includes a first transparent substrate 1L (an example of the first support substrate), a transparent electrode 15L formed on the first transparent substrate 1L, and an alignment film M1L (an example of the alignment film) formed to cover the transparent electrode 15L. The transparent electrode 15L is formed of, for example, a transparent conductive film such as an indium tin oxide (ITO) film, or the like. The alignment film M1L is formed of the liquid crystal alignment agent according to the present embodiment described above. In detail, a coated film is formed to cover the transparent electrode 15L by using the liquid crystal alignment agent, a solvent is removed by heating the coated film, and then the coated film is subjected to predetermined alignment processing (for example, photo alignment processing in which linearly polarized ultraviolet rays are irradiated to the coated film at a predetermined angle), thereby forming the alignment film M1L. It should be noted that the rubbing processing may be performed as the alignment processing in another embodiment.

The lens-shaped substrate 201L includes a second transparent substrate 51L (an example of the second support substrate), a Fresnel lens structure 31L formed on the second transparent substrate 51L in a form in which respective lens surfaces divided in a concentric shape are connected to each other via stepped portions as an optical structure form, a transparent electrode 55L formed to cover the Fresnel lens structure 31L, and an alignment film M2L (an example of the alignment film) formed to cover the transparent electrode 55L. The Fresnel lens structure 31L is formed on the second transparent substrate 51L by an imprint (transfer) technology using a mold (die). The transparent electrode 55L is formed of, for example, a transparent conductive film such as an indium tin oxide (ITO) film, or the like. Similar to the alignment film M1L, the alignment film M2L is formed of the liquid crystal alignment agent according to the present embodiment described above. In detail, a coated film is formed to cover the transparent electrode 55L on the Fresnel lens structure 31L by using the liquid crystal alignment agent, a solvent is removed by heating the coated film, and then the coated film is subjected to predetermined alignment processing (for example, photo alignment processing in which linearly polarized ultraviolet rays are irradiated to the coated film at a predetermined angle), thereby forming the alignment film M2L. It should be noted that the rubbing processing may be performed as the alignment processing in another embodiment.

The liquid crystal layer LC2 is interposed between the flat substrate 101L and the lens-shaped substrate 201L, and is sealed by a sealant 50L. The sealant 50L is interposed between the flat substrate 101L and the lens-shaped substrate 201L, and surrounds the liquid crystal layer LC2.

Details of the method of producing the liquid crystal lens 1000L, or the like are disclosed in Patent Document 4 (Japanese Patent Publication NO. 5698328).

As shown in FIG. 9, in a state where a voltage is not applied, a pretilt angle of the liquid crystal compound (liquid crystal molecule) lc2 by effects of the alignment films M1L and M2L is approximately 0°. A major axis of the liquid crystal compound (liquid crystal molecule) lc2 is aligned in a direction along a flat surface of the substrate (a direction of an arrow D1 in FIG. 9), on a surface of the alignment film M2L formed on the Fresnel lens structure 31L. As shown in FIG. 9, a pretilt angle of the liquid crystal compound (liquid crystal molecule) lc2 is approximately 0° relative to lens surfaces 31La and 31Lb divided with a line L as a boundary in the state where a voltage is not applied, the line L being a line passing through the center of the liquid crystal lens 1000L. The divided lens surfaces 31La and 31Lb are slanted right-upwards and left-upwards relative to the second transparent substrate 51L, respectively. Therefore, in the region A of the divided lens surface 31La and the region B of the divided lens surface 31Lb, the liquid crystal compounds (liquid crystal molecules) lc2 are also initially aligned while being slanted right-upwards and left-upwards relative to the second transparent substrate 51L, respectively. An angle of a slanted surface of the Fresnel lens structure 31L serves to perform substantially the same function as that of the pretilt angle.

As shown in FIG. 10, when a voltage is applied to the liquid crystal layer LC2, the liquid crystal compounds (liquid crystal molecules) lc2 on the surface of the alignment film M1L are initially aligned while being slanted right-upwards, and the liquid crystal compounds (liquid crystal molecules) 1c2 in the region A of the divided lens surface 31La side are also initially aligned while being slanted right-upwards. Therefore, the liquid crystal compounds (liquid crystal molecules) lc2 on the divided lens surface 31La side slantly rise right-upwards. In addition, since the liquid crystal compounds (liquid crystal molecules) lc2 on the surface of the alignment film M1L, which are initially aligned while being slanted right-upwards, have a strong alignment restricting force or a high pretilt angle, most liquid crystal compounds (liquid crystal molecules) lc2 in the region B of the divided lens surface 31Lb, which are aligned while being slanted left-upwards also slantly rise right-upwards, that is, slantly rise in the same direction as that of the liquid crystal compounds (liquid crystal molecules) lc2 on the divided lens surface 31La, when a voltage is not applied. As described above, the liquid crystal compounds (liquid crystal molecule) lc2 in a state of slantly rising right-upwards predominate when a voltage is applied.

Also in the liquid crystal panel P2 of the liquid crystal lens 1000L as described above, the liquid crystal compound (liquid crystal molecule) having high polarity is used, similarly to the liquid crystal panel P1 of the scanning antenna 1000 described above.

The liquid crystal panel according to the present embodiment can be used for the liquid crystal lens 1000L having the configuration as described above.

EXAMPLE

Hereinafter, the present invention will be described in more detail based on examples. It should be noted that the present invention is not limited at all by these examples.

Production of Liquid Crystal Panel for Scanning Antenna

Example 1

A TFT substrate having the same basic configuration as that of the TFT substrate 101 included in the liquid crystal panel P1 of the scanning antenna 1000 described above and a slot substrate having the same basic configuration as that of the slot substrate 201 included in the liquid crystal panel P1 similarly were prepared, respectively. An alignment film of the TFT substrate and an alignment film of the slot substrate both were formed by using an alignment agent 1 described below.

The alignment agent 1 is formed of a solution in which an acrylic polymer (carboxyl group-containing acrylic polymer) containing a constitutional unit derived from a cinnamic acid is dissolved in a solvent so as to have a content of 1% by mass. As the solvent, the mixed solvent in which NMP and butyl cellosolve were mixed at a mass ratio of 8:2 was used.

When forming the respective alignment films on the TFT substrate and the slot substrate, first, the alignment agent 1 was coated on the respective substrates by using a spin coater, thereby forming coated films formed of the alignment agent 1 on the respective substrates, respectively. Then, the respective coated films were heated at 70° C. for 5 minutes, and then further heated at 150° C. for 10 minutes, thereby removing a solvent in the coated film, or the like. Then, rubbing processing (alignment processing) was performed on the respective coated films of the TFT substrate and the slot substrate to form alignment films on the respective surfaces of the TFT substrate and the slot substrate, respectively, the alignment films being formed of the alignment agent 1.

A thermosetting sealant (trade name "HC-1413FP" produced by Mitsui Chemicals, Inc.) was drawn in a frame shape on surfaces (a surface facing the alignment film) of the TFT substrate using a seal dispenser. Then, the TFT substrate and the slot substrate were bonded to each other such that the sealant is interposed therebetween, and heated (fired) at 110° C. for 60 minutes, thereby producing an empty panel in which the liquid crystal material is not filled. Then, a liquid crystal material L1 to be described below was filled in the empty panel by a vacuum injection method using an injection port provided in the thermosetting sealant.

The liquid crystal material L1 consists of a mixture of a trade name "MLC 3019" (Merck KGaA) (liquid crystal 1) and a liquid crystal compound (liquid crystal 2) represented by the Chemical Formula (10-1). The mixing ratio (weight ratio) between the liquid crystal 1 and the liquid crystal 2 in the liquid crystal material L1 is liquid crystal 1:liquid crystal 2=95:5. The dielectric anisotropy ($\Delta\varepsilon$) of the liquid crystal material L1 is 11 (1 kHz, 20° C.).

The injection port was filled by using a sealing agent (trade name "TB3026E" made by ThreeBond Co., Ltd.).

Thereafter, the panel filled with the liquid crystal material was heated at 130° C. for 40 minutes to realign the liquid crystal compounds to obtain a liquid crystal panel in which the liquid crystal compounds was uniformly oriented uniaxially.

Examples 2 to 5 and Comparative Example 1

Liquid crystal panels according to Examples 2 to 5 and Comparative Example 1 were obtained in the same manner as in Example 1 except that liquid crystal materials L2 to L6 to be described below were used in place of the liquid crystal material L.

The liquid crystal material L2 may be a mixture of a trade name "MLC 3019" (Merck KGaA) (liquid crystal 1) and a liquid crystal compound (liquid crystal 2) represented by the Chemical Formula (10-2). The mixing ratio (weight ratio) between the liquid crystal 1 and the liquid crystal 2 in the liquid crystal material L2 is liquid crystal 1:liquid crystal 2=95:5. The dielectric anisotropy (A) of the liquid crystal material L2 is 16 (1 kHz, 20° C.).

The liquid crystal material L3 consists of a mixture of a trade name "MLC 3019" (Merck KGaA) (liquid crystal 1) and a liquid crystal compound (liquid crystal 2) represented by the Chemical Formula (10-3). The mixing ratio (weight ratio) between the liquid crystal 1 and the liquid crystal 2 in the liquid crystal material L3 is liquid crystal 1:liquid crystal 2=95:5. The dielectric anisotropy ($\Delta\varepsilon$) of the liquid crystal material L3 is 111 (1 kHz, 20° C.).

The liquid crystal material L4 consists of a mixture of a trade name "MLC 3019" (Merck KGaA) (liquid crystal 1) and a liquid crystal compound (liquid crystal 2) represented by the Chemical Formula (10-4). The mixing ratio (weight ratio) between the liquid crystal 1 and the liquid crystal 2 in the liquid crystal material L4 is liquid crystal 1:liquid crystal 2=95:5. The dielectric anisotropy ($\Delta\varepsilon$) of the liquid crystal material L4 is 12 (1 kHz, 20° C.).

The liquid crystal material L5 consists of a mixture of a trade name "MLC 3019" (Merck KGaA) (liquid crystal 1) and a liquid crystal compound (liquid crystal 2) represented by the Chemical Formula (10-5). The mixing ratio (weight ratio) between the liquid crystal 1 and the liquid crystal 2 in the liquid crystal material L5 is liquid crystal 1:liquid crystal 2=95:5. The dielectric anisotropy ($\Delta\varepsilon$) of the liquid crystal material L5 is 11 (1 kHz, 20° C.).

The liquid crystal material L6 consists of a mixture of a trade name "MLC 3019" (Merck KGaA) (liquid crystal 1) and a liquid crystal compound (liquid crystal 2) represented by the Chemical Formula (11-1). The mixing ratio (weight ratio) between the liquid crystal 1 and the liquid crystal 2 in the liquid crystal material L6 is liquid crystal 1:liquid crystal 2=95:5. The dielectric anisotropy ($\Delta\varepsilon$) of the liquid crystal material L6 is 10 (1 kHz, 20° C.).

Example 6

A liquid crystal panel of Example 6 was obtained in the same manner as in Example 1 except that an alignment agent 2 to be described later was used in place of the alignment agent 1.

The alignment agent 2 is a solution in which a polymethyl acrylate (PMMA, a carboxyl group-free acrylic polymer) is dissolved in a solvent so as to have a content of 1% by mass. As the solvent, the mixed solvent in which NMP and butyl cellosolve were mixed at a mass ratio of 8:2 was used.

Examples 7 to 11

Liquid crystal panels according to Examples 7 to 11 were obtained in the same manner as in Example 6 except that liquid crystal materials L2 to L6 were used in place of the liquid crystal material L1.

Example 12

A liquid crystal panel of Example 12 was obtained in the same manner as in Example 1 except that an alignment agent 3 to be described later was used in place of the alignment agent 1.

The alignment agent 3 is a solution in which a polyamic acid is dissolved in a solvent so as to have a content of 1% by mass. As the solvent, the mixed solvent in which NMP and butyl cellosolve were mixed at a mass ratio of 8:2 was used.

Examples 13 to 16 and Comparative Example 2

Liquid crystal panels according to Examples 13 to 16 and Comparative Example 2 were obtained in the same manner as in Example 12 except that liquid crystal materials L2 to L6 were used in place of the liquid crystal material L1.

Example 17

A liquid crystal panel of Example 17 was obtained in the same manner as in Example 1 except that an alignment agent 4 to be described later was used in place of the alignment agent 1.

The alignment agent 4 is a solution in which a polyimide (soluble polyimide) is dissolved in a solvent so as to have a content of 1% by mass. As the solvent, the mixed solvent in which NMP and butyl cellosolve were mixed at a mass ratio of 8:2 was used.

Examples 18 to 22

Liquid crystal panels according to Examples 18 to 22 were obtained in the same manner as in Example 17 except that liquid crystal materials L2 to L6 were used in place of the liquid crystal material L.

[High Temperature Retention Test]

The liquid crystal panels according to Examples 1 to 22 and Comparative Examples 1 and 2 were retained at 95° C. for 1000 hours. Thereafter, each liquid crystal panel was interposed between a pair of polarizing plates under a room temperature condition, and a change in color (retardation) of each liquid crystal panel was visually confirmed. The change in colors of each liquid crystal panel was compared with the colors of the liquid crystal panel when the liquid crystal panel was interposed between a pair of polarizing plates which was visually observed in advance before the high temperature retention test. The results are shown in Table 1.

In addition, after the retention at a high temperature for 1000 hours, it was visually confirmed whether crystals were generated in each liquid crystal panel. When crystals were generated in the liquid crystal panel, the crystals were further observed (reconfirmed) using a polarization microscope. The results are shown in Table 1.

As described above, each liquid crystal panel was visually observed, and then each liquid crystal panel was again retained for 1000 hours (that is, a total of 2000 hours) under the condition of 95° C. Thereafter, each liquid crystal panel was interposed between a pair of polarizing plates under a room temperature condition, and a change in color (retardation) of each liquid crystal panel was visually confirmed.

In addition, after the retention at a high temperature of 2000 hours, the change in the colors (retardation) of each liquid crystal panel and whether bubbles were generated in the liquid crystal layer were observed visually or the like as in the case after 1000 hours. The results are shown in Table 1.

TABLE 1

| | ALIGNMENT AGENT | | LIQUID CRYSTAL LAYER | | |
|---|---|---|---|---|---|
| | | | | | $\Delta \varepsilon$ |
| | NO. | KIND OF POLYMERS | NO. | LIQUID CRYSTAL 1 | LIQUID CRYSTAL 2 | (20° C., 1 kHz) |
| EXAMPLE 1 | 1 | CARBOXYL GROUP-CONTAINING ACRYLIC POLYMER (INCLUDING STRUCTURE DERIVED FROM CINNAMIC ACID) | L1 | MLC3019 | FORMULA (10-1) | 11 |
| EXAMPLE 2 | | | L2 | MLC3019 | FORMULA (10-2) | 16 |
| EXAMPLE 3 | | | L3 | MLC3019 | FORMULA (10-3) | 11 |
| EXAMPLE 4 | | | L4 | MLC3019 | FORMULA (10-4) | 12 |
| EXAMPLE 5 | | | L5 | MLC3019 | FORMULA (10-5) | 11 |
| COMPARATIVE EXAMPLE 1 | | | L6 | MLC3019 | FORMULA (11-1) | 10 |
| EXAMPLE 6 | 2 | CARBOXYL GROUP-FREE ACRYLIC POLYMER (PMMA) | L1 | MLC3019 | FORMULA (10-1) | 11 |
| EXAMPLE 7 | | | L2 | MLC3019 | FORMULA (10-2) | 16 |
| EXAMPLE 8 | | | L3 | MLC3019 | FORMULA (10-3) | 11 |
| EXAMPLE 9 | | | L4 | MLC3019 | FORMULA (10-4) | 12 |
| EXAMPLE 10 | | | L5 | MLC3019 | FORMULA (10-5) | 11 |
| EXAMPLE 11 | | | L6 | MLC3019 | FORMULA (11-1) | 10 |
| EXAMPLE 12 | 3 | POLYAMIC ACID | L1 | MLC3019 | FORMULA (10-1) | 11 |
| EXAMPLE 13 | | | L2 | MLC3019 | FORMULA (10-2) | 16 |
| EXAMPLE 14 | | | L3 | MLC3019 | FORMULA (10-3) | 11 |
| EXAMPLE 15 | | | L4 | MLC3019 | FORMULA (10-4) | 12 |
| EXAMPLE 16 | | | L5 | MLC3019 | FORMULA (10-5) | 11 |

TABLE 1-continued

| | | | | | | |
|---|---|---|---|---|---|---|
| COMPARATIVE EXAMPLE 2 | | | L6 | MLC3019 | FORMULA (11-1) | 10 |
| EXAMPLE 17 | 4 | POLYIMIDE | L1 | MLC3019 | FORMULA (10-1) | 11 |
| EXAMPLE 18 | | | L2 | MLC3019 | FORMULA (10-2) | 16 |
| EXAMPLE 19 | | | L3 | MLC3019 | FORMULA (10-3) | 11 |
| EXAMPLE 20 | | | L4 | MLC3019 | FORMULA (10-4) | 12 |
| EXAMPLE 21 | | | L5 | MLC3019 | FORMULA (10-5) | 11 |
| EXAMPLE 22 | | | L6 | MLC3019 | FORMULA (11-1) | 10 |

| | HIGH TEMPERATURE RETENTION (1000 HOURS) | | HIGH TEMPERATURE RETENTION (2000 HOURS) | |
|---|---|---|---|---|
| | CHANGE IN RETARDATION | CRYSTALLIZATION | CHANGE IN RETARDATION | CRYSTALLIZATION |
| EXAMPLE 1 | ABSENCE | ABSENCE | ABSENCE | ABSENCE |
| EXAMPLE 2 | ABSENCE | ABSENCE | ABSENCE | ABSENCE |
| EXAMPLE 3 | ABSENCE | ABSENCE | ABSENCE | ABSENCE |
| EXAMPLE 4 | ABSENCE | ABSENCE | ABSENCE | ABSENCE |
| EXAMPLE 5 | ABSENCE | ABSENCE | ABSENCE | ABSENCE |
| COMPARATIVE EXAMPLE 1 | PRESENCE | PRESENCE | PRESENCE | PRESENCE |
| EXAMPLE 6 | ABSENCE | ABSENCE | ABSENCE | ABSENCE |
| EXAMPLE 7 | ABSENCE | ABSENCE | ABSENCE | ABSENCE |
| EXAMPLE 8 | ABSENCE | ABSENCE | ABSENCE | ABSENCE |
| EXAMPLE 9 | ABSENCE | ABSENCE | ABSENCE | ABSENCE |
| EXAMPLE 10 | ABSENCE | ABSENCE | ABSENCE | ABSENCE |
| EXAMPLE 11 | ABSENCE | ABSENCE | ABSENCE | PRESENCE |
| EXAMPLE 12 | ABSENCE | ABSENCE | ABSENCE | ABSENCE |
| EXAMPLE 13 | ABSENCE | ABSENCE | ABSENCE | ABSENCE |
| EXAMPLE 14 | ABSENCE | ABSENCE | ABSENCE | ABSENCE |
| EXAMPLE 15 | ABSENCE | ABSENCE | ABSENCE | ABSENCE |
| EXAMPLE 16 | ABSENCE | ABSENCE | ABSENCE | ABSENCE |
| COMPARATIVE EXAMPLE 2 | PRESENCE | ABSENCE | PRESENCE | ABSENCE |
| EXAMPLE 17 | ABSENCE | ABSENCE | ABSENCE | ABSENCE |
| EXAMPLE 18 | ABSENCE | ABSENCE | ABSENCE | ABSENCE |
| EXAMPLE 19 | ABSENCE | ABSENCE | ABSENCE | ABSENCE |
| EXAMPLE 20 | ABSENCE | ABSENCE | ABSENCE | ABSENCE |
| EXAMPLE 21 | ABSENCE | ABSENCE | ABSENCE | ABSENCE |
| EXAMPLE 22 | ABSENCE | ABSENCE | ABSENCE | PRESENCE |

As shown in Table 1, it was confirmed that the change in retardation and the crystallization (generation of crystals) were not observed even after each liquid crystal panel of Examples 1 to 22 is retained at a high temperature for 1000 hours and the heat resistance is excellent.

In contrast, in Comparative Example 1, the change in retardation and the crystallization were observed after the retention at a high temperature for 1000 hours (which is the same even after the retention for 2000 hours). In the liquid crystal layer of Comparative Example 1, the liquid crystal compounds containing an isothiocyanate group (NCS group) is contained, and in the alignment film, the constitutional unit derived from the cinnamic acid contains the carboxyl group. It is estimated that the NCS group contained in the liquid crystal compounds (liquid crystal molecules) reacts with a very small amount of water contained in the liquid crystal layer to be easily changed to an $NH_2$ group. At that time, if the isolated protons are present, it can be said that the reaction between the NCS group and water is accelerated. In Comparative Example 1, it can be said that since the carboxyl group is contained in the alignment film, the reaction between the NCS group and the water is likely to occur at the interface between the alignment film and the liquid crystal layer.

It is considered that the liquid crystal compounds in which the NCS group is changed to the $NH_2$ group are integrated with the polymer of the alignment film by hydrogen bonding or amide bonding of the $NH_2$ with the carboxyl group present on the surface of the alignment film. It should be noted that the liquid crystal compounds contain the aliphatic alkyl group in addition to the NCS group. Since the alignment film usually has the higher polarity than that of the aliphatic alkyl group, the aliphatic alkyl group of the liquid crystal compound integrated with the alignment film is excluded from the alignment film and is formed to be exposed on the surface of the alignment film. That is, the surface of the alignment film is covered with the aliphatic alkyl group derived from the liquid crystal compounds, such that the surface energy of the alignment film is reduced.

It is estimated that the reduction in the surface energy causes the action of vertically aligning the liquid crystal layer (liquid crystal compound), and thus the change in alignment of the liquid crystal layer is induced and the change in retardation of the liquid crystal layer is observed.

A metal material having a thickness of 1 μm or more is often used for a substrate (a TFT substrate or the like) used for a scanning antenna for the purpose of reflection of electromagnetic waves or the like, and when the alignment film is fired at a high temperature, the alignment film is likely to be warped together with the substrate supporting the alignment film. Therefore, the heating treatment is not performed on the alignment film at a high temperature (for example, 220° C. or higher) for a long time (for example, 40 minutes). That is, a crosslinking reaction with a crosslinking group such as an epoxy group, an anhydridization reaction between the carboxyl groups, a reaction (imidization reaction) with the amide bond of the carboxyl groups and the like are unlikely to occur in the carboxyl group in the alignment film. Therefore, it can be said that the above-mentioned problem tends to become more serious.

Further, since the NH$_2$ group generated during the above reaction tends to react with the NCS group, the liquid crystal compounds having the NCS group may be dimerized and thus liquid crystallinity. As a result, it is presumed that the crystallization occurs in the liquid crystal layer.

In addition, the liquid crystal compounds having an NH$_2$ group are changed when the liquid crystal compounds have the original NCS group and are changed such that the temperature range of the liquid crystal and the polarity of the liquid crystal compounds (liquid crystal molecules) themselves are lowered, such that the compatibility of the liquid crystal compounds with the original liquid crystal material becomes worse and the liquid crystal compounds are likely to be precipitated as crystals.

In Comparative Example 2, after the retention at a high temperature for 1000 hours, the change in retardation was observed. In Comparative Example 2, the crystallization was not observed. In addition, even after the retention at a high temperature for 2000 hours, the same results as those after 1000 hours were obtained.

In Example 11 (polymethyl methacrylate) and Example 22 (polyimide), after the retention at a high temperature for 2000 hours, crystallization (generation of crystals) was each observed. This is presumed to be caused due to intrusion of moisture into the liquid crystal layer from the outside. In Example 11 (polymethyl methacrylate) and Example 22 (polyimide), the change in retardation was not observed.

Example 23

A liquid crystal panel according to Example 23 was obtained in the same manner as in Example 1 except that an alignment agent 5 to be described later was used in place of the alignment agent 1.

The alignment agent 5 is formed of a solution in which the mixed resin (polymer blend) obtained by mixing the polyimide (30% by mass) and the polyamic acid (70% by mass) is dissolved in a solvent so as to have a content of 1% by mass. As the solvent, the mixed solvent in which the NMP and the butyl cellosolve were mixed at a mass ratio of 8:2 was used.

Examples 24 to 28

Liquid crystal panels according to Examples 24 to 28 were obtained in the same manner as in Example 23 except that liquid crystal materials L2 to L6 were used in place of the liquid crystal material L.

[High Temperature Retention Test]

For each of the liquid crystal panels according to Examples 23 to 28, a high temperature retention test was performed in the same manner as in Example 1 and the like, and after 1000 hours and 2000 hours, it was confirmed whether retardation is changed and crystals are generated. The results are shown in Table 2.

TABLE 2

| | ALIGNMENT AGENT | | LIQUID CRYSTAL LAYER | | |
|---|---|---|---|---|---|
| | NO. | KIND OF POLYMERS | NO. | LIQUID CRYSTAL 1 | LIQUID CRYSTAL 2 | Δε (20° C., 1 kHz) |
| EXAMPLE 23 | 5 | POLYMER BLEND | L1 | MLC3019 | FORMULA (10-1) | 11 |
| EXAMPLE 24 | | (30 wt % OF POLYIMIDE + | L2 | MLC3019 | FORMULA (10-2) | 16 |
| EXAMPLE 25 | | 70 wt % OF | L3 | MLC3019 | FORMULA (10-3) | 11 |
| EXAMPLE 26 | | POLYAMIC ACID) | L4 | MLC3019 | FORMULA (10-4) | 12 |
| EXAMPLE 27 | | | L5 | MLC3019 | FORMULA (10-5) | 11 |
| EXAMPLE 28 | | | L6 | MLC3019 | FORMULA (11-1) | 10 |

| | HIGH TEMPERATURE RETENTION (1000 HOURS) | | HIGH TEMPERATURE RETENTION (2000 HOURS) | |
|---|---|---|---|---|
| | CHANGE IN RETARDATION | CRYSTALLIZATION | CHANGE IN RETARDATION | CRYSTALLIZATION |
| EXAMPLE 23 | ABSENCE | ABSENCE | ABSENCE | ABSENCE |
| EXAMPLE 24 | ABSENCE | ABSENCE | ABSENCE | ABSENCE |
| EXAMPLE 25 | ABSENCE | ABSENCE | ABSENCE | ABSENCE |
| EXAMPLE 26 | ABSENCE | ABSENCE | ABSENCE | ABSENCE |
| EXAMPLE 27 | ABSENCE | ABSENCE | ABSENCE | ABSENCE |
| EXAMPLE 28 | ABSENCE | ABSENCE | ABSENCE | ABSENCE |

As shown in Table 2, it was confirmed that the change in retardation and the crystallization (generation of crystals) were not observed even after each liquid crystal panel according to Examples 23 to 28 is retained at a high temperature for 2000 hours and the heat resistance is excellent. As a polymer constituting the alignment film, a mixed resin (polymer blend) of a polyimide and a polyamic acid according to Examples 23 to 28 has the highest reliability. This is because it is presumed that the polyimide tends to be present on the outermost surface of the alignment film due to the difference in surface energy, while the polyamic acid has a stronger effect of trapping impurities than the polyimide and traps contaminants from the substrate and thus it is difficult to elute the impurities in the liquid crystal layer.

Production of Liquid Crystal Panel for Liquid Crystal Lens

Example 29

A flat substrate having the same basic configuration as that of the flat substrate 101L included in the liquid crystal panel P2 of the liquid crystal lens 1000L described above and a lens-shaped substrate having the same basic configuration as that of the lens-shaped substrate 201L included in the liquid crystal panel P2 similarly were prepared, respectively. An alignment film of the flat substrate and an alignment film of the lens-shaped substrate both were formed by using the same alignment agent 5 as that in Example 23.

When forming the respective alignment films on the flat substrate and the lens-shaped substrate, first, the alignment agent 5 was coated on the respective substrates by using a coating machine, thereby forming coated films formed of the alignment agent 5 on the respective substrates, respectively. Then, the respective coated films were heated at 70° C. for 5 minutes, and then further heated at 150° C. for 30 minutes, thereby removing a solvent in the coated film, or the like. Then, rubbing processing (alignment processing) was performed on the respective coated films of the flat substrate and the lens-shaped substrate to form alignment films on the respective surfaces of the flat substrate and the lens-shaped substrate, respectively, the alignment films being formed of the alignment agent 5.

A thermosetting sealant (trade name "HC-1413FP" produced by Mitsui Chemicals, Inc.) was drawn in a frame shape on surfaces (a surface facing the alignment film) of the flat substrate using a seal dispenser. Then, the flat substrate and the lens-shaped substrate were bonded to each other such that the sealant is interposed therebetween, and heated at 130° C. for 40 minutes, thereby producing an empty panel in which the liquid crystal material is not filled. Then, a liquid crystal material L1 was filled in the empty panel in the same manner as Example 23 by a vacuum injection method using an injection port provided in the thermosetting sealant.

The injection port was filled by using a sealing agent (trade name "TB3026E" made by ThreeBond Co., Ltd.).

Thereafter, the panel filled with the liquid crystal material was heated at 130° C. for 40 minutes to realign the liquid crystal compounds to obtain a liquid crystal panel in which the liquid crystal compounds was uniformly oriented uniaxially. In the lens-shaped substrate, the liquid crystal compound is aligned along a surface shape of the Fresnel lens structure.

Examples 30 to 34

Liquid crystal panels according to Examples 30 to 34 for a liquid crystal lens were obtained in the same manner as in Example 29 except that liquid crystal materials L2 to L6 were used in place of the liquid crystal material L.

[High Temperature Retention Test]

For each of the liquid crystal panels according to Examples 30 to 34, a high temperature retention test was performed in the same manner as in Example 1 and the like, and after 1000 hours and 2000 hours, it was confirmed whether retardation is changed and crystals are generated. The results are shown in Table 3.

TABLE 3

| | ALIGNMENT AGENT | | LIQUID CRYSTAL LAYER | | |
|---|---|---|---|---|---|
| | NO. | KIND OF POLYMERS | LIQUID NO. | LIQUID CRYSTAL 1 | CRYSTAL 2 | $\Delta \varepsilon$ (20° C., 1 kHz) |
| EXAMPLE 29 | 5 | POLYMER BLEND | L1 | MLC3019 | FORMULA (10-1) | 11 |
| EXAMPLE 30 | | (30 OF POLYIMIDE + | L2 | MLC3019 | FORMULA (10-2) | 16 |
| EXAMPLE 31 | | 70 wt % OF | L3 | MLC3019 | FORMULA (10-3) | 11 |
| EXAMPLE 32 | | POLYAMIC ACID) | L4 | MLC3019 | FORMULA (10-4) | 12 |
| EXAMPLE 33 | | | L5 | MLC3019 | FORMULA (10-5) | 11 |
| EXAMPLE 34 | | | L6 | MLC3019 | FORMULA (11-1) | 10 |

| | HIGH TEMPERATURE RETENTION (1000 HOURS) | | HIGH TEMPERATURE RETENTION (2000 HOURS) | |
|---|---|---|---|---|
| | CHANGE IN RETARDATION | CRYSTALLIZATION | CHANGE IN RETARDATION | CRYSTALLIZATION |
| EXAMPLE 29 | ABSENCE | ABSENCE | ABSENCE | ABSENCE |
| EXAMPLE 30 | ABSENCE | ABSENCE | ABSENCE | ABSENCE |
| EXAMPLE 31 | ABSENCE | ABSENCE | ABSENCE | ABSENCE |
| EXAMPLE 32 | ABSENCE | ABSENCE | ABSENCE | ABSENCE |
| EXAMPLE 33 | ABSENCE | ABSENCE | ABSENCE | ABSENCE |
| EXAMPLE 34 | ABSENCE | ABSENCE | ABSENCE | ABSENCE |

As shown in Table 3, even for each liquid crystal panel for the liquid crystal antenna according to Examples 23 to 28, similar to each liquid crystal panel for the scanning antenna according to the above Examples 29 to 34, it was confirmed that, even after the retention at a high temperature for 2000 hours, the change in retardation and the crystallization (generation of crystals) were not observed and the heat resistance is excellent.

EXPLANATION OF SYMBOLS

100: First substrate
110: First support substrate
M: Alignment film
LC: Liquid crystal layer
200: Second substrate
220: Second support substrate
P: Liquid crystal panel
1: Dielectric substrate (First dielectric substrate)
3: Gate electrode
4: Gate insulating layer
5: Semiconductor layer
6D: Drain contact layer
6S: Source contact layer
7D: Drain electrode 7S: Source electrode
10: TFT
11: First insulating layer
15: Patch electrode
17: Second insulating layer
51: Dielectric substrate (Second dielectric substrate)
55 Slot electrode
55L: Lower layer
55M: Main layer
55U: Upper layer
57: Slot
57U: Slot electrode unit
58: Third insulating layer
70: Feeding device
72: Feeding pin
80: Sealant
101: TFT substrate
201: Slot substrate
1000: Scanning antenna
U: Antenna unit (Antenna unit region)
CH1: Contact hole
LC1: Liquid crystal layer
P: Composite panel
GD: Gate driver
GL: Gate bus line
GT: Gate terminal portion
SD: Source driver
SL: Source bus line
ST: Source terminal portion
PT: Transfer terminal portion
R1: Transmission/reception region
R2: Non-transmission/reception region
Rs: Seal region
1000L: Liquid crystal Lens
101L: Flat substrate
1L: First transparent substrate
15L: Transparent electrode
M1L: Alignment film
LC2: Liquid crystal layer
201L: Lens-shaped substrate
51L: Second transparent substrate
31L: Fresnel lens structure
55L: Transparent electrode
M2L: Alignment film
lc2: Liquid crystal molecule (Liquid crystal compound)

The invention claimed is:
1. A liquid crystal panel comprising:
a liquid crystal layer; and
a pair of first and second substrates disposed with the liquid crystal layer interposed therebetween and including an alignment film formed on a surface of each of the first and second substrates facing the liquid crystal layer, or a surface of any one of the first and second substrates facing the liquid crystal layer,
wherein
the alignment film contains a carboxyl group-containing polymer containing a carboxyl group,
the liquid crystal layer comprises a liquid crystal compound that contains at least one selected from the group consisting of a cyano group, a heterocyclic ring, $-OCF_2-$, a carbon-carbon triple bond and a trifluoromethyl group, contains an aliphatic alkyl group at a terminal thereof, and does not contain an isothiocyanate group, and
a plurality of antenna units are arranged.

2. The liquid crystal panel according to claim 1, wherein the liquid crystal compound contains at least two selected from the group.

3. The liquid crystal panel according to claim 1, wherein the liquid crystal compound of the liquid crystal layer contains two or more $-OCF_2-$ contained in one molecule thereof.

4. The liquid crystal panel according to claim 1, wherein the liquid crystal compound of the liquid crystal layer contains the cyano group and the carbon-carbon triple bond contained in one molecule thereof.

5. The liquid crystal panel according to claim 1, wherein the liquid crystal compound of the liquid crystal layer contains the cyano group and the heterocyclic ring contained in one molecule thereof.

6. The liquid crystal panel according to claim 1, wherein the liquid crystal compound of the liquid crystal layer contains the carbon-carbon triple bond and the heterocyclic ring contained in one molecule thereof.

7. The liquid crystal panel according to claim 1, wherein the liquid crystal compound of the liquid crystal layer contains the carbon-carbon triple bond and the $-OCF_2-$ contained in one molecule thereof.

8. A scanning antenna comprising:
the liquid crystal panel according to claim 1, and
a reflective conductive plate that is disposed to face an opposite surface of a second dielectric substrate on which a slot electrode is not formed with a dielectric layer interposed therebetween, wherein
the first substrate of the liquid crystal panel includes a thin film transistor (TFT) substrate that includes a first dielectric substrate, a plurality of TFTs supported by the first dielectric substrate, a plurality of patch electrodes electrically connected to the TFTs, and a first alignment film disposed to cover the TFTs and the patch electrodes and constituting the alignment film,
the second substrate of the liquid crystal panel includes a slot substrate that includes the second dielectric substrate, the slot electrode supported by the second dielectric substrate and including a plurality of slots, and a second alignment film disposed to cover the slot electrode and constituting the alignment film, and
the liquid crystal layer of the liquid crystal panel is interposed between the TFT substrate and the slot substrate of which the first alignment film and the second alignment film face each other.

9. A liquid crystal panel, comprising:
a liquid crystal layer; and
a pair of first and second substrates disposed with the liquid crystal layer interposed therebetween, and including an alignment film formed on a surface of each of the first and second substrates facing the liquid crystal layer, or a surface of any one of the first and second substrates facing the liquid crystal layer,
wherein
the alignment film contains a carboxyl group-free polymer containing no carboxyl group,
the liquid crystal layer comprises a liquid crystal compound that contains an aliphatic alkyl group at a terminal thereof, and contains an isothiocyanate group,
the liquid crystal compound further contains at least two selected from the group consisting of a cyano group, a heterocyclic ring, $-OCF_2-$, a carbon-carbon triple bond, and a trifluoromethyl group, and
a plurality of antenna units are arranged.

10. The liquid crystal panel according to claim 9, wherein the carboxyl group-free polymer is a polyimide or a carboxyl group-free acrylic polymer containing no carboxyl group.

11. A liquid crystal panel, comprising:
a liquid crystal layer; and
a pair of first and second substrates disposed with the liquid crystal layer interposed therebetween, and including an alignment film formed on a surface of each of the first and second substrates facing the liquid crystal layer, or a surface of any one of the first and second substrates facing the liquid crystal layer,
wherein
the alignment film is formed of a mixed resin formed by mixing a polyimide and another polymer, and
a plurality of antenna units are arranged.

12. The liquid crystal panel according to claim 11, wherein the liquid crystal layer comprises a liquid crystal compound that contains an aliphatic alkyl group at a terminal thereof and contains an isothiocyanate group.

13. The liquid crystal panel according to claim 11, wherein the liquid crystal layer comprises a liquid crystal compound that contains at least two selected from the group consisting of a cyano group, a heterocyclic ring, —$OCF_2$—, a carbon-carbon triple bond, and a trifluoromethyl group, contains the aliphatic alkyl group at the terminal thereof, and does not contain an isothiocyanate group.

\* \* \* \* \*